United States Patent
Sasaki

(10) Patent No.: US 8,649,155 B2
(45) Date of Patent: Feb. 11, 2014

(54) ELECTRONIC COMPONENT INCLUDING REINFORCING ELECTRODES

(75) Inventor: Tomohiro Sasaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 280 days.

(21) Appl. No.: 13/187,678

(22) Filed: Jul. 21, 2011

(65) Prior Publication Data
US 2012/0019982 A1    Jan. 26, 2012

(30) Foreign Application Priority Data

Jul. 21, 2010  (JP) ................................ 2010-164161
Jun. 13, 2011  (JP) ................................ 2011-131439

(51) Int. Cl.
*H01G 4/228* (2006.01)
*H01G 4/005* (2006.01)
*H01G 4/06* (2006.01)

(52) U.S. Cl.
USPC ...................... 361/303; 361/306.3; 361/321.2

(58) Field of Classification Search
USPC .............. 361/321.2, 303, 306.3, 321.1, 321.3
See application file for complete search history.

(56) References Cited

U.S. PATENT DOCUMENTS

| | | | |
|---|---|---|---|
| 6,563,689 B2 * | 5/2003 | Yamamoto ................. | 361/306.1 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,190,566 B2 * | 3/2007 | Tonogai et al. ................ | 361/303 |
| 7,206,187 B2 * | 4/2007 | Satou ............................ | 361/309 |
| 7,319,582 B2 * | 1/2008 | Takashima et al. ........... | 361/303 |

(Continued)

FOREIGN PATENT DOCUMENTS

JP    2001-210545 A    8/2001
JP    2005-340663 A    12/2005

(Continued)

OTHER PUBLICATIONS

Iwanaga et al., "Laminated Ceramic Electronic Component and Manufacturing Method Therefor", U.S. Appl. No. 13/189,636, filed Jul. 25, 2011.

(Continued)

*Primary Examiner* — David M Sinclair
(74) *Attorney, Agent, or Firm* — Keating & Bennett, LLP

(57) ABSTRACT

An electronic component includes a ceramic body including first to fourth side surfaces, a first external electrode provided on one side surface of the ceramic body, a second external electrode, and a plurality of reinforcing electrodes. Each of the first and second external electrodes includes a thick-film electrode layer including sintered metal, a plated layer arranged so as to cover the thick-film electrode layer, an external electrode main body portion covering the side surface of the ceramic body, and turnback portions extending to the top surface and the bottom surface of the ceramic body. An end portion of at least one reinforcing electrode of the plurality of reinforcing electrodes is exposed on the top surface or the bottom surface of the ceramic body on the center portion of the ceramic body in relation to the thick-film electrode layer in the turnback portion.

12 Claims, 16 Drawing Sheets

(56) References Cited

U.S. PATENT DOCUMENTS

| | | | |
|---|---|---|---|
| 7,344,981 B2 | 3/2008 | Ritter et al. | |
| 7,345,868 B2 | 3/2008 | Trinh | |
| 7,463,474 B2 | 12/2008 | Ritter et al. | |
| 7,551,422 B2 * | 6/2009 | Togashi | 361/309 |
| 7,602,601 B2 * | 10/2009 | Togashi | 361/306.3 |
| 7,652,869 B2 * | 1/2010 | Togashi | 361/306.3 |
| 7,715,173 B2 * | 5/2010 | Bultitude et al. | 361/303 |
| 8,125,765 B2 * | 2/2012 | Ishida et al. | 361/321.2 |
| 2005/0041368 A1 * | 2/2005 | Togashi | 361/306.3 |
| 2005/0046536 A1 | 3/2005 | Ritter et al. | |
| 2005/0201040 A1 * | 9/2005 | Ahiko et al. | 361/321.2 |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2010/0091429 A1 * | 4/2010 | Koga et al. | 361/321.2 |

FOREIGN PATENT DOCUMENTS

| | | |
|---|---|---|
| JP | 2005-340664 A | 12/2005 |
| JP | 2006-060147 A | 3/2006 |
| JP | 2006-060148 A | 3/2006 |
| JP | 2006-100498 A | 4/2006 |

OTHER PUBLICATIONS

Taniguchi et al., "Multilayer Ceramic Electronic Component and Manufacturing Method Thereof", U.S. Appl. No. 12/485,360, filed Jun. 16, 2009.

Yoshida et al., "Monolithic Ceramic Electronic Component", U.S Appl. No. 12/494,537, filed Jun. 30, 2009.

* cited by examiner

ELECTRONIC COMPONENT INCLUDING REINFORCING ELECTRODES

BACKGROUND OF THE INVENTION

1. Field of the Invention

The present invention relates to an electronic component, such as a laminated ceramic capacitor, for example, and in particular, an electronic component including a plurality of internal electrodes that are connected to different potentials within a ceramic sintered body and that are laminated through a ceramic layer.

2. Description of the Related Art

In the past, electronic components have been widely used which include a plurality of internal electrodes that are disposed within a ceramic sintered body. In Japanese Unexamined Patent Application Publication No. 2001-210545, a laminated ceramic capacitor 101 illustrated in FIG. 23A is disclosed. The laminated ceramic capacitor 101 includes a ceramic sintered body 102. Within the ceramic sintered body 102, a plurality of first internal electrodes 103 and a plurality of second internal electrodes 104 are provided.

A first external electrode 105 is provided on a first end surface 102a of the ceramic sintered body 102. A second external electrode 106 is provided on a second end surface 102b. The first external electrode 105 includes a thick-film electrode layer 105a formed by firing conductive paste. Plated films 105b and 105c are laminated on the thick-film electrode layer 105a. The plated film 105b includes Ni and is provided so as to prevent solder leaching. The plated film 105c includes Sn, for example, and is provided so as to improve solderability.

The first and second external electrodes 105 and 106 are arranged so as to cover the first and second end surfaces 102a and 102b of the ceramic sintered body 102. In addition, in order to improve mountability, the external electrodes 105 and 106 include turnback portions extending to a top surface 102c and a bottom surface 102d of the ceramic sintered body 102.

The plated film 105b is formed so as to cover the entire surface of the thick-film electrode layer 105a. The plated film 105c is formed so as to cover the entire surface of the outer surface of the plated film 105b.

At the time of the formation of the thick-film electrode layer 105a, conductive paste is applied to and fired onto the laminated ceramic capacitor 101. After this firing, a residual stress occurs at a position indicated by an arrow A in FIG. 23B, namely, the end portion of the turnback portion. The residual stress is due to a difference between the thermal expansion coefficients of ceramics and the thick-film electrode layer 105a at the time of firing.

In addition, when the laminated ceramic capacitor 101 is mounted on a substrate, the first and second external electrodes 105 and 106 are bonded to electrode lands on the substrate using conductive bonding material, such as solder or other suitable bonding material. When a stress, such as deflection, is applied from the outside after bonding, a stress occurs at the end portions of the turnback portions of the external electrodes 105 and 106. Namely, a stress occurs at the portion indicated by the arrow A.

As described above, a residual stress at the time of the formation of the external electrode and a stress due to the deflection of the substrate at the time of mounting and after mounting and a stress, such as a thermal shock, are concentrated into the portion indicated by the arrow A. As a result, a problem is caused in that a crack occurs in the ceramic sintered body 102, starting from the portion into which the stresses are concentrated.

SUMMARY OF THE INVENTION

To overcome the problems described above, preferred embodiments of the present invention provide an electronic component that prevents cracks from occurring in a ceramic body due to the stress concentration in the end portion of the external electrode.

According to a preferred embodiment of the present invention, an electronic component preferably includes a ceramic body, first and second external electrodes, and a plurality of reinforcing electrodes. The ceramic body has a substantially rectangular parallelepiped shape and includes a top surface, a bottom surface, and first to fourth side surfaces connecting the top surface and the bottom surface to each other. The first external electrode is provided on one side surface of the first to fourth side surfaces. The second external electrode is also provided on one side surface of the first to fourth side surfaces.

Each of the first and second external electrodes preferably includes a thick-film electrode layer including sintered metal and a plated layer arranged so as to cover the thick-film electrode layer.

On the other hand, each of the first and second external electrodes includes an external electrode main body portion covering the side surface on which the one of the first and second external electrodes is provided and turnback portions that extend into the external electrode main body portion and to the top surface and the bottom surface of the ceramic body.

The plurality of reinforcing electrodes are provided within the ceramic body. An end portion of at least one reinforcing electrode of the plurality of reinforcing electrodes is exposed, on the top surface or the bottom surface of the ceramic body, on a center portion of the ceramic body in relation to the thick-film electrode layer in the turnback portion. In addition, preferably, the plated layer is arranged so as to cover the thick-film electrode layer and an exposed portion of the end portion of the at least one reinforcing electrode. Accordingly, an end edge of the plated layer is preferably located on a center portion in relation to an end edge of the thick-film electrode layer, in the turnback portion.

According to another preferred embodiment of the present invention, the ceramic body preferably includes the ceramic sintered body and a plurality of internal electrodes disposed within the ceramic sintered body so as to overlap one another through a ceramic layer. The plurality of internal electrodes include a first internal electrode extending to at least one side surface of the first to fourth side surfaces of the ceramic body and a second internal electrode extending to at least one side surface of the first to fourth side surfaces of the ceramic body. The first and second external electrodes are provided on the side surfaces to which the first and second internal electrodes extend, respectively.

According to another preferred embodiment of the present invention, a region in which the internal electrodes connected to different potentials preferably overlap one another through the ceramic layer is a valid region, and regions, located on an outer side of the valid region and located between the valid region and the side surfaces to which the first and second internal electrodes extend, are first and second extraction regions, respectively. The plurality of reinforcing electrodes preferably include a plurality of first reinforcing electrodes arranged so as to extend onto the first extraction region and the valid region and a plurality of second reinforcing electrodes arranged so as to extend onto the second extraction region and the valid region.

According to another preferred embodiment of the present invention, the plural first and second reinforcing electrodes are preferably disposed in at least one of outer layer portions located above and below a portion in which the plurality of internal electrodes are disposed.

Preferably, the first and second reinforcing electrodes are provided in both of the outer layer portions located above and below a portion in which the plurality of internal electrodes overlap one another. Accordingly, it is possible to effectively prevent a crack from occurring in the end portions of the turnback portions of the first and second external electrodes on the top surface and the bottom surface of the ceramic sintered body.

Areas of the plurality of first and second reinforcing electrodes preferably decrease with a decrease in distance from the closer one of the top surface and the bottom surface. Accordingly, it is possible to easily adjust the degree of exposure of the reinforcing electrode exposed to the ceramic sintered body outer surface.

When dimensions in which the valid region-side end portions of the first and second reinforcing electrodes are connected to opposite-side end portions thereof are lengths of the first and second reinforcing electrodes, the lengths of the first and second reinforcing electrodes preferably decrease with a decrease in the distance from a closer one of the top surface and the bottom surface of the ceramic sintered body. In this case, it is also possible to easily adjust the degree of exposure of the first and second reinforcing electrodes exposed to the ceramic sintered body outer surface.

First and second extraction auxiliary electrodes are preferably further provided. In the first and second extraction regions, the first and second extraction auxiliary electrodes extend to the side surfaces, respectively, to which the internal electrode of the ceramic sintered body extends, and do not extend to the valid region. In the first and second extraction regions, the first and second extraction auxiliary electrodes are preferably arranged so as to overlap the first and second internal electrodes through the ceramic layer. In the configuration in which the first and second extraction auxiliary electrodes are provided, it is also possible to effectively prevent a crack from occurring in the ceramic body.

From among the first to fourth side surfaces, the first and second internal electrodes preferably extend to the first and second side surfaces facing each other, respectively. In this case, a plurality of units may be provided in which each unit includes the first and second internal electrodes and the first and second external electrodes.

According to another preferred embodiment of the present invention, from among the first to fourth side surfaces, the first internal electrode is extended to the first and second side surfaces facing each other, and the second internal electrode is extended to the third and fourth side surfaces facing each other.

Furthermore, while, according to various preferred embodiments of the present invention, the electronic component is not limited to a specific electronic component, a laminated ceramic capacitor is configured in a more restrictive aspect of preferred embodiments of the present invention, and it is possible to provide the laminated ceramic capacitor in which a crack is prevented from occurring, in accordance with a preferred embodiment of the present invention.

In the electronic component according to various preferred embodiments of the present invention, the end portion of at least one reinforcing electrode is preferably exposed on the top surface or the bottom surface of the ceramic body, and the plated layer is arranged so as to cover the exposed end portion. Accordingly, in the turnback portion, the end edge of the plated layer is located on a center portion in relation to the end edge of the thick-film electrode layer. Accordingly, it is possible to distribute the portion into which the stresses are concentrated in the ceramic body. Therefore, it is possible to effectively prevent cracking of the ceramic body. Furthermore, it is also possible to significantly improve the intensity of the adhesiveness of a portion to the ceramic body, the portion being located on a center portion in relation to the end edge of the thick-film electrode layer of the plated film.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, specific preferred embodiments of the present invention will be described with reference to drawings and thereby the present invention will be clarified.

Figure 1A:
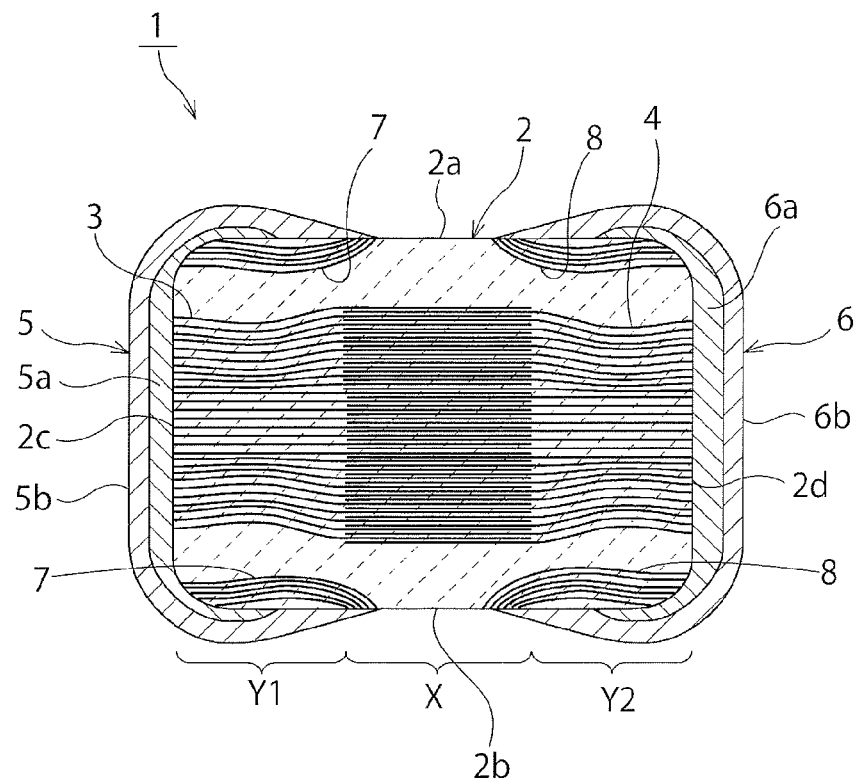
FIGS. 1A and 1B are an elevation view of an electronic component according to a first preferred embodiment of the present invention and a partially cutaway elevation cross-sectional view enlarging and illustrating a main portion thereof.
Figure 3A:
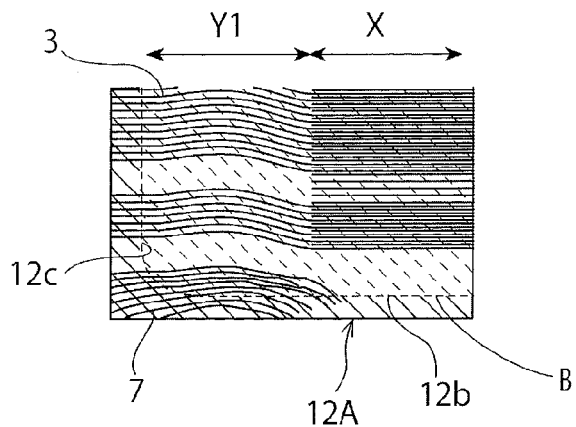
FIG. 3A is a partially cutaway elevation cross-sectional view illustrating a main portion of a laminated body before barrel polishing of one electronic component unit cut out from the laminated body of the mother illustrated in FIG. 2.
Figure 3B:
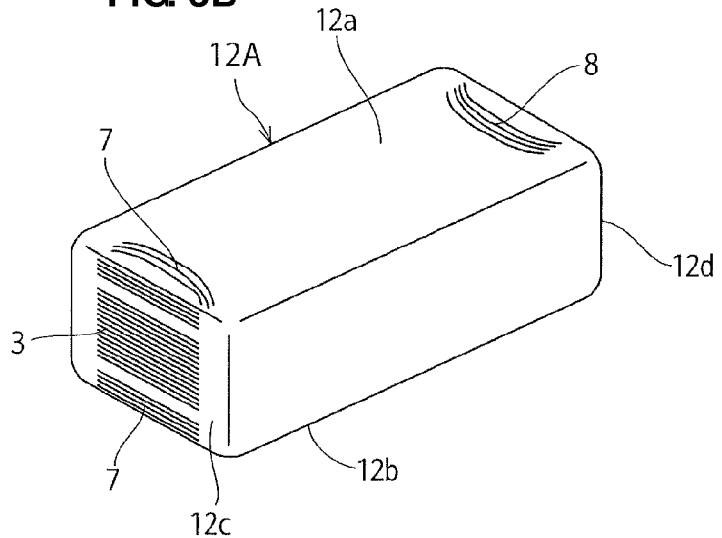
FIG. 3B is a perspective view illustrating the laminated body after the barrel polishing.
Figure 3C:
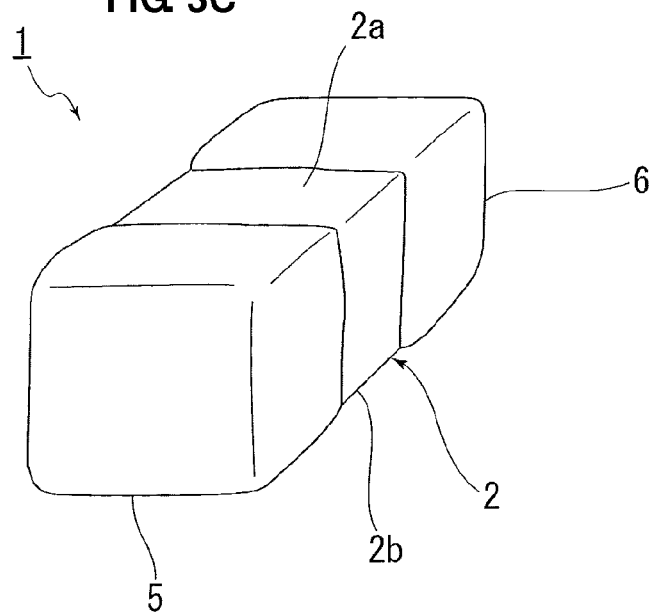
FIG. 3C is a perspective view illustrating an appearance of the electronic component according to the first preferred embodiment of the present invention.

FIG. 1A is an elevation view illustrating a laminated ceramic capacitor as an electronic component according to a first preferred embodiment of the present invention, and the appearance thereof is illustrated in FIG. 3C in a perspective view.

A laminated ceramic capacitor 1 preferably includes a ceramic sintered body 2. The ceramic sintered body 2 preferably has a substantially rectangular parallelepiped shape.

As described below, the corner portions and ridge line portions thereof are rounded by barrel polishing.

The ceramic sintered body 2 includes a top surface 2a, a bottom surface 2b, first and second side surfaces 2c and 2d facing each other, and third and fourth side surfaces facing each other, no illustrated in FIG. 1A.

As illustrated in FIG. 1A, in the ceramic sintered body 2, a plurality of first internal electrodes 3 and a plurality of second internal electrodes 4 are arranged so as to overlap one another through a ceramic layer. The first internal electrode 3 and the second internal electrode 4 are connected to potentials that are different from each other. The first internal electrode 3 and the second internal electrode 4 are disposed substantially in parallel with the top surface 2a and the bottom surface 2b. As illustrated in FIG. 1A, in a lamination and pressurization process and a firing process, described later, the shape thereof is partially deformed. Accordingly, the first and second internal electrodes 3 and 4 are not exactly parallel to the top and bottom surfaces 2a and 2b, and instead, are substantially parallel to the top and bottom surfaces 2a and 2b.

The first internal electrode 3 extends to the first side surface 2c. The second internal electrode 4 extends to the second side surface 2d. It is assumed that a direction in which the first side surface 2c and the second side surface 2d are connected to each other is a length direction. In addition, it is assumed that a direction in which the third and fourth side surfaces of the ceramic sintered body 2 are connected to each other is a width direction and a direction in which the top surface 2a and the bottom surface 2b are connected to each other is a thickness direction. While the length direction dimension of the ceramic sintered body 2 is preferably set to a dimension greater than the dimension of the width direction, the relationship therebetween may be reversed.

The first internal electrode 3 and the second internal electrode 4 overlap each other in the central portion of the length direction through the ceramic layer. It is assumed that the overlapping portion is a valid region X. The valid region X is a portion used to extract electrostatic capacity.

In addition, a portion that is located outside of the valid region X and located between the first side surface 2c and the valid region X is a first extraction region Y1. A region located the valid region X and the second side surface 2d is a second extraction region Y2.

In the first extraction region Y1, only the plurality first internal electrodes 3 overlap one another through the ceramic layer. In the same manner, in the second extraction region Y2, only the plurality second internal electrodes 4 overlap one another through the ceramic layer.

In the ceramic sintered body 2, a portion located above a portion in which the first and second internal electrodes 3 and 4 are provided is a first outer layer portion and a portion located below the portion in which the first and second internal electrodes 3 and 4 are provided is a second outer layer portion.

The ceramic sintered body 2 preferably includes arbitrary dielectric ceramics, such as barium titanate series ceramics or other suitable ceramics, for example. It is clear from a manufacturing method described below that conductive paste printed on a ceramic green sheet is burned at the time of firing, thereby forming the first and second internal electrodes 3 and 4. With respect to metallic material used for the first and second internal electrodes 3 and 4, arbitrary metal, such as Ag, Ag—Pd, or other suitable metals, for example, may preferably be used.

A first external electrode 5 is arranged so as to cover the first side surface 2c. In addition, a second external electrode 6 is arranged so as to cover the second side surface 2d. In addition to external electrode main body portions covering the first and second side surfaces 2c and 2d, the first and second external electrodes 5 and 6 preferably include turnback portions extending to the top surface 2a and the bottom surface 2b of the ceramic sintered body 2 and the third and fourth side surfaces thereof.

In addition, the first external electrode 5 preferably includes a thick-film electrode layer 5a formed by burning conductive paste and a plated layer 5b formed on the thick-film electrode layer 5a. In the same manner, the second external electrode 6 also preferably includes a thick-film electrode layer 6a and a plated layer 6b. The thick-film electrode layers 5a and 6a preferably include sintered metal layers formed by burning conductive paste such as Ag paste or other suitable paste. The plated layer 5b and 6b are preferably formed by being plated with metal such as Ni, Sn, or other suitable metal, for example. The plated layer 5b and 6b may also include a plurality of plated layers that are laminated.

The film thicknesses of the plated layers 5b and 6b are less than those of the thick-film electrode layers 5a and 6a including the sintered metal.

One of the unique features of the laminated ceramic capacitor 1 is that a plurality of first reinforcing electrodes 7 and a plurality of second reinforcing electrodes 8 are provided and the end portions of the plated layers 5b and 6b are displaced from the positions of the end portions of the thick-film electrode layers 5a and 6a in the turnback portions. This will be described in more detail.

Figure 1B:
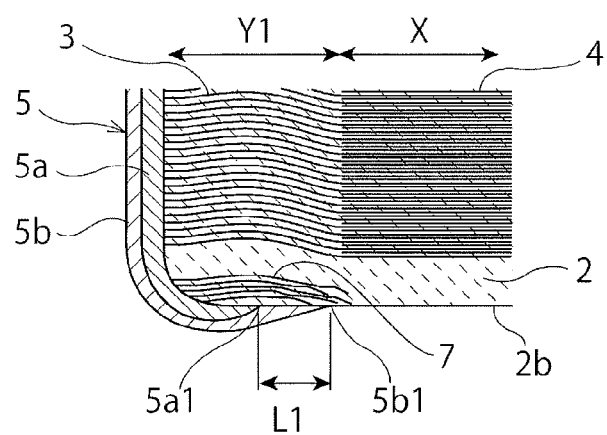

As described above, within the ceramic sintered body 2, the first outer layer portion and the second outer layer portion are provided above and below the portion in which the first and second internal electrodes 3 and 4 overlap each other, respectively. In the first and second outer layer portions, the plurality of first reinforcing electrodes 7 and the plurality of second reinforcing electrodes 8 are provided, respectively. FIG. 1B is a partially cutaway elevation cross-sectional view enlarging and illustrating the lower portion of the first side surface 2c. As illustrated in FIG. 1B, the plurality of first reinforcing electrodes 7 are provided within the second outer layer portion. The plurality of first reinforcing electrode 7 includes arbitrary metallic material. As such metallic material, it is preferable to use the same metallic material as the first and second internal electrodes 3 and 4. Accordingly, the manufacturing process is simplified and the type of material used is reduced.

However, the material used for the first and second reinforcing electrodes 7 and 8 may be different from the material used for the first and second internal electrodes 3 and 4.

The plurality of first reinforcing electrodes 7 are arranged so as to extend onto the extraction region Y1 and the valid region X. The valid region-side end portion of the first reinforcing electrode 7 is located below the valid region X. The plurality of first reinforcing electrodes 7 overlap one another through the ceramic layer.

As illustrated in FIG. 1B, the first reinforcing electrode 7 extends to the first side surface 2c. The end portion of the first reinforcing electrode 7, which is on the side opposite to the valid region-side end portion thereof, is connected to the thick-film electrode layer 5a of the first external electrode 5. In addition, while the first side surface 2c is a vertically extending surface, the corner portion thereof is preferably rounded by barrel polishing, for example, as described below. Accordingly, the end portion of the first reinforcing electrode 7, which is on the side opposite to the valid region-side end portion thereof, is also exposed in the rounded portion.

The valid region-side end portion of at least one reinforcing electrode 7 from among the plurality of first reinforcing electrodes 7 is preferably exposed on the bottom surface 2b of the ceramic sintered body 2. Accordingly, at the time of the formation of the plated layer 5b, it is also possible to attach the plated layer 5b onto the portion of the first reinforcing electrode 7, exposed on the bottom surface 2b. Therefore, as illustrated in FIG. 1B, the plated layer 5b not only coats the outer surface of the thick-film electrode layer 5a but also extends to a center portion in relation to the end portion 5a1 of the turnback portion of the thick-film electrode layer 5a, namely, extends to the valid region X side. Specifically, the plated layer 5b is also attached onto the exposed end portion of the first reinforcing electrode 7.

FIG. 1B illustrates the lower portion of the first side surface 2c of the ceramic sintered body 2. The upper portion of the first side surface 2c of the ceramic sintered body 2 and the upper and lower portions of the second side surface 2d are also configured in substantially the same manner.

In the laminated ceramic capacitor 1 of the present preferred embodiment, as described above, compared to the end portion 5a1 of the turnback portion of the thick-film electrode layer 5a, the end portion 5b1 in the turnback portion of the plated layer 5b is displaced inward by the distance of L1 in the length direction. When manufacturing the laminated ceramic capacitor 1, conductive paste is applied and burned so as to cover the side surfaces 2c and 2d of the ceramic sintered body 2. In this case, stresses are concentrated in the end portion 5a1 of the thick-film electrode layer 5a, and a residual stress occurs.

As described above, in the laminated ceramic capacitor 101 of the related art, since the end portion of the thick-film electrode layer and the end portion of the plated film coincide with each other in the end portion of the turnback portion, the concentration of stresses occurs. In contrast, in the present preferred embodiment, the end portion 5b1 in the turnback portion of the plated layer 5b is displaced from the end portion 5a1 by the distance of L1.

On the other hand, when the deflection of the substrate or a thermal shock is applied at the time of or after mounting the laminated ceramic capacitor 1 on the substrate, stresses are concentrated into the end portion of the turnback portion of the external electrode 5, namely, the end portion 5b1 of the plated layer 5b. Accordingly, a portion into which stresses are concentrated in this case and a portion into which stresses are concentrated at the time of manufacturing and in which a residual stress occurs are displaced from each other by the distance of L1. Therefore, even if the deflection of the substrate or a thermal shock is applied, cracks are prevented from occurring.

Next, an example of a manufacturing method for the laminated ceramic capacitor 1 according to a preferred embodiment of the present invention will be described with reference to FIGS. 2 to 5.

Figure 2:
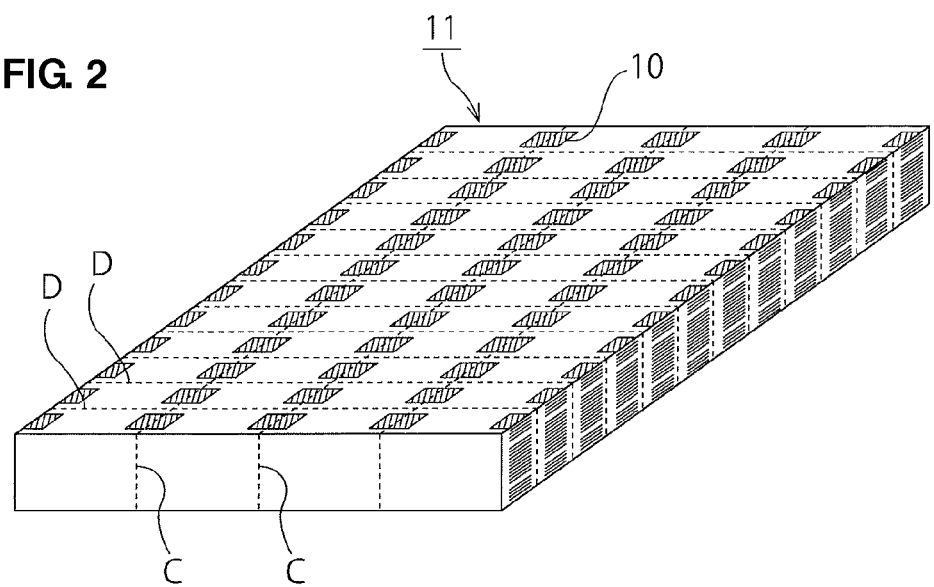
FIG. 2 is a perspective view illustrating a laminated body of a mother prepared for manufacturing the electronic component according to the first preferred embodiment of the present invention.

FIG. 2 illustrates a laminated body 11 of the mother prepared for producing the laminated ceramic capacitor 1 according to a preferred embodiment of the present invention. The laminated body 11 of the mother is obtained in accordance with the following process.

First, a substantially rectangular ceramic green sheet a mother is prepared. Next, conductive paste is screen-printed on the ceramic green sheet of the mother, thereby forming an internal electrode pattern into which the plurality of first internal electrodes are assembled. Next, an internal electrode pattern into which the plurality of second internal electrodes are assembled is formed on the ceramic green sheet of another mother using the screen printing of conductive paste.

The formation of the internal electrode pattern is not limited to the screen printing of the conductive paste, and the internal electrode pattern may also be formed using a thin film forming method such as vapor deposition, plating, sputtering, or other suitable method, for example.

The ceramic green sheet of the mother on which the internal electrode pattern used to form the above-mentioned first internal electrode is formed and the ceramic green sheet of the mother on which the internal electrode pattern to form the second internal electrode are alternately laminated. Furthermore, on the top and bottom of the laminated body obtained in such a manner, a plurality of plain ceramic green sheets of the mother are preferably laminated. Furthermore, on the top and bottom portions thereof, a plurality of ceramic green sheets of the mother, on which electrode patterns used to form the above-mentioned reinforcing electrode are formed, are preferably laminated. The above-mentioned plain ceramic green sheets of the mother and the ceramic green sheets of the mother, on which electrode patterns used to form the reinforcing electrode are formed, are provided to configure the above-mentioned outer layer portions.

In addition, hereinafter, a ceramic green sheet of the mother and disposed on an outermost side in a lamination direction in the outer layer portion is referred to as an outermost layer sheet. In this manufacturing method, an electrode pattern used to form the reinforcing electrode is also formed on the top surface of the outermost layer sheet. As illustrated in FIG. 2, an electrode pattern 10 is formed on the top surface of the laminated body 11 of the mother. This electrode pattern 10 is a portion to be divided into the first and second reinforcing electrodes 7 and 8. As described later, since the laminated body chip is polished by barrel polishing, the electrode pattern 10 on the outermost layer sheet exposed on the laminated body 11 is preferably deleted. However, the electrode pattern 10 used to form the reinforcing electrode may not be necessarily formed on the outer surface side of the outermost layer sheet.

The laminated body 11 of the mother, obtained as described above, is pressurized in the thickness direction. This pressurization is performed so as to improve the adhesion of ceramic green sheets to each other. In this case, in the valid region X and the first and second extraction regions Y1 and Y2, illustrated in FIG. 1A, the numbers of electrode lamination thereof are preferably different. Therefore, the first and second internal electrodes 3 and 4 are deformed as illustrated in FIG. 1A. In the same manner, when illustrated in an elevation cross-sectional view, the first and second reinforcing electrodes 7 and 8 are deformed as illustrated in FIG. 1A.

Next, the laminated body 11 of the mother is cut along dashed lines C and D in FIG. 2. Accordingly, individual laminated bodies are obtained in units of laminated ceramic capacitors.

In the laminated body obtained as described above, surfaces adjacent to each other are arranged at about a 90-degree angle with respect to each other. In addition, the corner portions thereof are sharp. Therefore, when laminated bodies collide with one another, a crack or a chip may easily occur. Therefore, barrel polishing processing is preferably performed. Consequently, a ridge line portion and a corner portion are rounded.

FIG. 3A is a schematic partially cutaway elevation cross-sectional view to explain the amount of barrel polishing of the laminated body. In FIG. 3A, the lower portion of each of the laminated bodies 12A obtained in units of laminated ceramic capacitors as described above is illustrated. The laminated body 12A is preferably polished up to a portion indicated by a dashed line B, by barrel polishing. In this manner, the laminated body 12A illustrated in FIG. 3B whose corner portions and ridge lines are rounded is obtained.

Figure 4A:
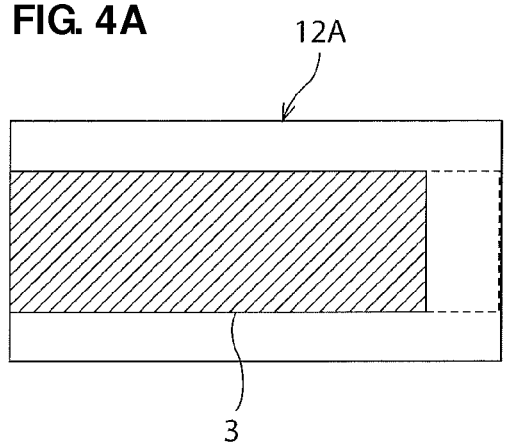
FIGS. 4A and 4B are individual schematic plan views to explain first and second internal electrodes provided in the electronic component according to the first preferred embodiment of the present invention.
Figure 4B:
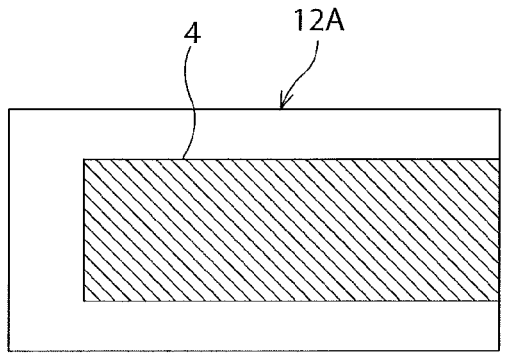

In the laminated body 12A, the first and second internal electrodes 3 and 4 are located as illustrated in FIGS. 4A and 4B. Accordingly, when performing the above-mentioned pressurization process, the valid region X and the first extraction region Y1 have different thicknesses from one another. Due to a difference between the numbers of internal electrode lamination thereof, the thickness of the valid region X is thicker than the first extraction region Y1. Therefore, the first and second internal electrodes 3 and 4 are deflected toward a central portion in the thickness direction of the laminated body 12A. Furthermore, the first reinforcing electrode 7 provided in the outer layer portion is also deflected in the valid region X as illustrated in the figure, in the lower portion.

Accordingly, when subjected to barrel polishing as illustrated by the dashed line B, the end portions of the plurality of first reinforcing electrodes 7 located in the valid region X are exposed on the laminated body bottom surface after barrel polishing.

Arrangements in which the first and second reinforcing electrodes 7 and 8 are exposed on outer surface of the laminated body 12A will be described in more detail with reference to FIGS. 5 and 6.

Figure 5:
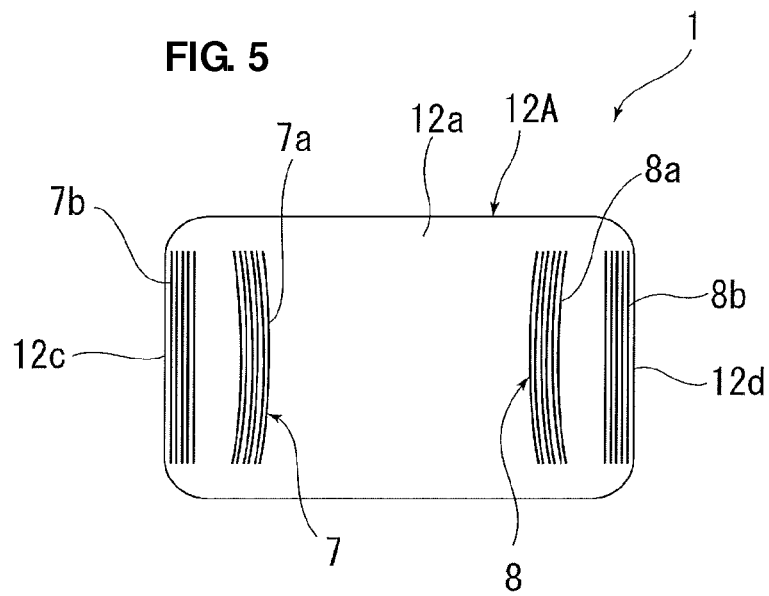
FIG. 5 is a schematic plan view of a ceramic body after barrel polishing in the first preferred embodiment of the present invention.

FIG. 5 is the schematic plan view of the laminated body 12A after barrel polishing. As illustrated in FIG. 5, on the top surface 12a of the laminated body 12A, the end portion 7a or 8a of at least one reinforcing electrode 7 or 8 from among the first and second reinforcing electrodes 7 and 8 is exposed on the top surface 12a of the laminated body 12A. In addition, the end portion 7b or 8b, which is on the side opposite to the end portion 7a or 8a, is exposed on the upper portions of the side surfaces 12c and 12d of the laminated body 12A and a potion of the top surface 12a thereof.

In addition, the plurality of end portions 7a or 8a are exposed on the top surface 12a and spaced apart from one another.

Figure 6:
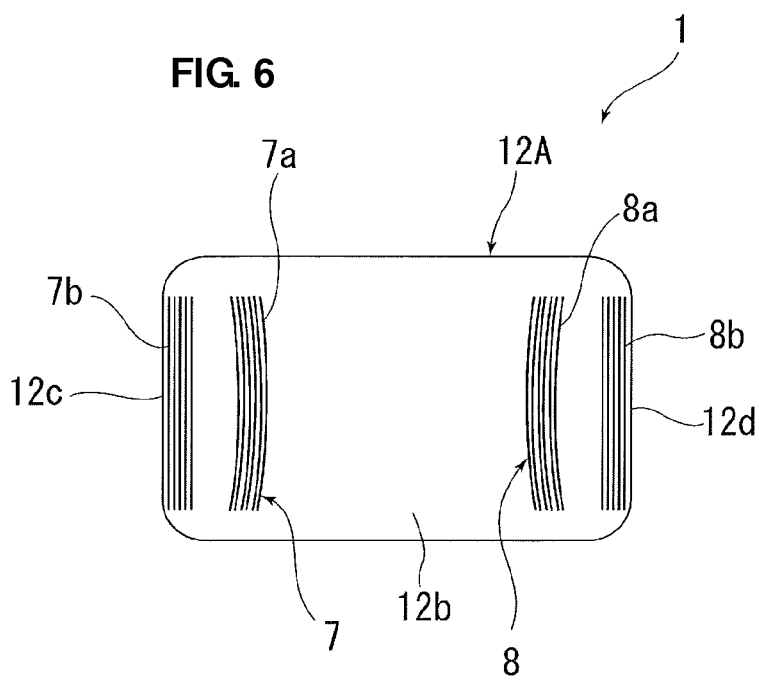
FIG. 6 is a schematic bottom view of the ceramic body after the barrel polishing in the first preferred embodiment of the present invention.

As illustrated in FIG. 6, on the bottom surface 12b of the laminated body 12A, the end portions 7a and 8a which are at least portions of the plurality first and second reinforcing electrodes 7 and 8 are also exposed on the bottom surface 12b.

In addition, it is only necessary for the valid region-side end portion of at least one reinforcing electrode 7 of the plurality of first reinforcing electrodes 7 to be exposed on the top surface 2a or bottom surface 2b of the ceramic sintered body 2. In the same manner, in the plurality second reinforcing electrodes 8, it is only necessary for the valid region-side end portion of at least one second reinforcing electrode 8 to be exposed.

Figure 7:
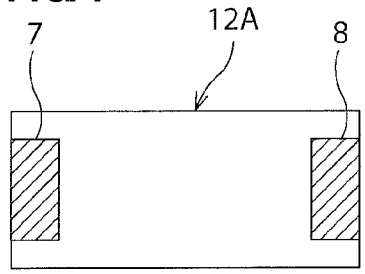
FIG. 7 is a schematic plan view illustrating planar shapes of first and second reinforcing electrodes formed on a ceramic green sheet in the first preferred embodiment of the present invention.

FIG. 7 is a schematic plan view to explain the substantially planar shapes of the first and second reinforcing electrodes 7 and 8 used to obtain the laminated body 12A.

Since, in the above-mentioned pressurization process, in which the reinforcing electrodes are pressurized in the thickness direction, the reinforcing electrodes 7 and 8 whose shapes are substantially rectangle are deformed as illustrated in FIG. 3A. In addition, as described above, the outer surface of the laminated body 12A is polished up to the position indicated by the dashed line B illustrated in FIG. 3A, by barrel polishing. Therefore, as illustrated in FIGS. 3B, 5, and 6, on the top surface 12a or bottom surface 12b of the laminated body 12A, the valid region-side end portion is exposed in the form of a substantially curved line convexly deflected to the inside of the laminated body 12A, with respect to an end edge defined by the first side surface 12c or the second side surface 12d and the top surface 12a or the bottom surface 12b. It is preferable that the curvature radius of the laminated body 12 ranges from about 10 μm to about 80 μm, for example. However, if the curvature radius is too small, a crack and a chip may easily occur, and if the curvature radius is too large, vacuum leak may easily occur at the time of substantial vacuum contact with a nozzle such that vacuum contact may not be possible.

It is preferable that a distance between reinforcing electrodes adjacent to each other in the first and second reinforcing electrodes 7 and 8 is within a range from about 0.5 μm to about 3 μm, for example. If the distance between the reinforcing electrodes is large, plating is less likely to adhere or it tends to take a long time to develop plating growth. In addition, in some cases, it is difficult to form thick plated layers 5b and 6b. On the other hand, if the distance between the reinforcing electrodes is small, the number of reinforcing electrodes is increased, and manufacturing cost is increased accordingly.

In addition, as a method for adjusting the distance between the reinforcing electrodes, a method for adjusting the number of ceramic layers laminated between the reinforcing electrodes and/or the thicknesses thereof may be used.

It is preferable that the number of each of the first and second reinforcing electrodes 7 and 8 is in a range from 10 to 40, for example. In this case, it is possible to improve the densities of exposed portions of the end portions of the first and second reinforcing electrodes 7 and 8. Accordingly, the plating growth is likely to occur during the formation of the plated layers 5b and 6b described later. In view of enabling the plating growth to be more likely to occur, it is preferable that a distance between the first and second reinforcing electrodes 7 and 8 is less than or equal to about 20 μm, for example. If the distance between the first and second reinforcing electrodes 7 and 8 on the top surface 2a or the bottom surface 2b is too large, the thicknesses of portions of the first and second reinforcing electrodes 7 and 8 located on the top surface 2a or the bottom surface 2b may be too thin.

In addition, it is preferable that the thicknesses of the first and second reinforcing electrodes 7 and 8 fall within a range from about 0.3 μm to about 2 μm, for example. If the first and second reinforcing electrodes 7 and 8 are too thin, it is difficult to adequately deflect the first and second reinforcing electrodes 7 and 8 in an isostatic pressing process described later. On the other hand, if the first and second reinforcing electrodes 7 and 8 are too thick, portions in which the first and second internal electrodes 3 and 4 overlap the first and second reinforcing electrodes 7 and 8 in the thickness direction are pressed too strongly. Therefore, in some cases, a structural defect may occur and the reliability of the obtained laminated ceramic capacitor 1 is reduced.

In addition, if the thicknesses of the first and second reinforcing electrodes 7 and 8 are about 0.7 μm, and the inclination angles of the end portions of the first and second reinforcing electrodes 7 and 8 are about 10 degrees, it is preferable that the widths of the exposed portions of the first and second reinforcing electrodes 7 and 8 are about 4 μm, for example. Since the flexion angles of the end portions of the first and second reinforcing electrodes 7 and 8 differ depending on a surrounding electrode geometry and a state in which a pressing pressure is applied is, all of the first and second reinforcing electrodes 7 and 8 are not deflected at a constant angle, and the flexion angles thereof substantially vary over a range from about 5 degrees to about 20 degrees, for example. In addition, the widths of the exposed portions of the first and second reinforcing electrodes 7 and 8 also substantially vary over a range from about 2 μm to about 8 μm, for example. Therefore, the distance between the reinforcing electrodes or the barrel polishing processing is adjusted.

By being adjusted in this manner, it is possible to set the area of the first reinforcing electrode 7 exposed on the top surface 2a to a value greater than or equal to about 30%, for example, of the area of the plated film of the external electrode when being looked from the side of the top surface 2a. If the exposed area of the first reinforcing electrode 7 is too small, the plating growth is not fully developed in a subsequent plating process, and in some cases, it is difficult to obtain the plated layers 5b and 6b having desired thicknesses. This is also true of the second reinforcing electrode.

Figure 9:
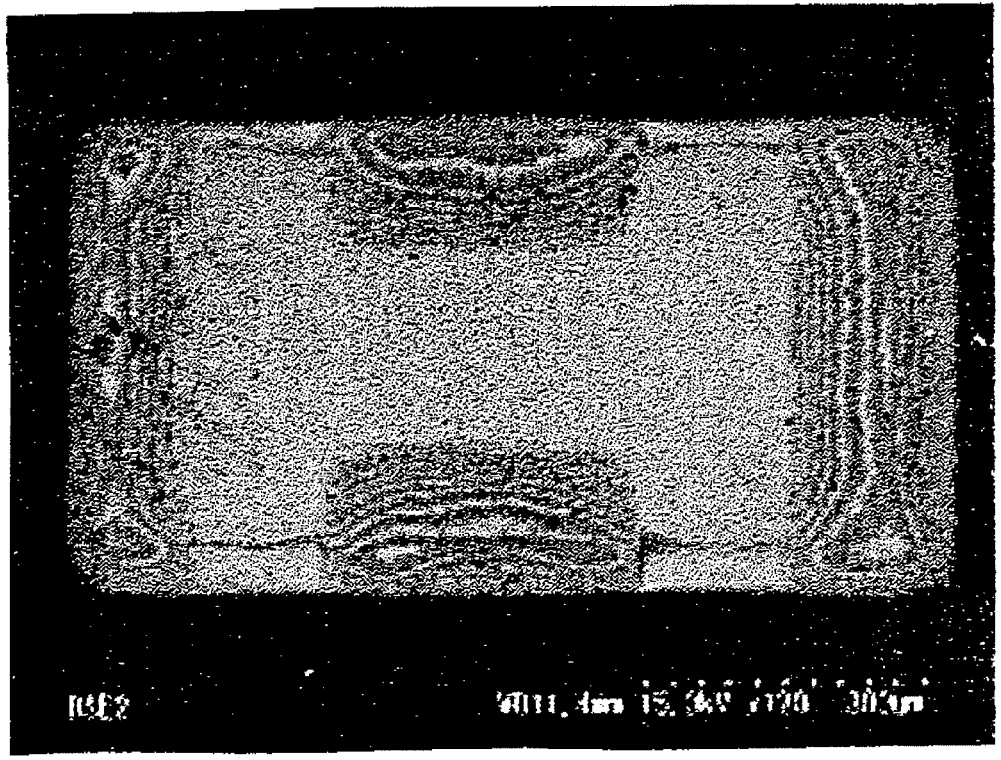
FIG. 9 is an electron microscope photograph when a ceramic sintered body in an example of manufacturing of the electronic component according to the first preferred embodiment of the present invention is viewed from above.

FIG. 9 is an electron microscope photograph of the top surface of the ceramic sintered body 2.

As shown in FIG. 9, it is understood that the turnback portion-side end portions of the first and second reinforcing electrodes are exposed in the pattern of a substantially curved line on the top surface of the ceramic sintered body 2.

As described above, a distance from the first side surface 2c of the ceramic sintered body 2 to the valid region-side end portion of the first reinforcing electrode 7 is determined based on the length direction dimension of the reinforcing electrode 7 before firing. This is also true of the second reinforcing electrode 8. Therefore, with respect to the first and second reinforcing electrodes 7 and 8, it is possible to set the positions of the valid region-side end portions thereof with a high degree of accuracy.

Figure 8A:
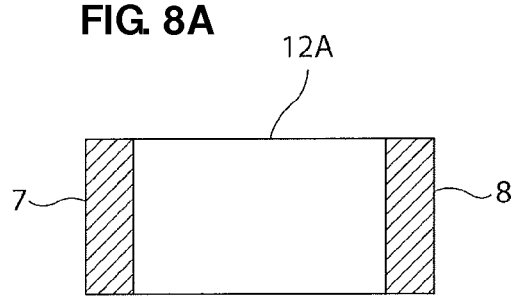
FIGS. 8A to 8C are individual plan views for explaining examples of modifications to the shape of the reinforcing electrode pattern, individually provided on the ceramic green sheet.
Figure 8B:
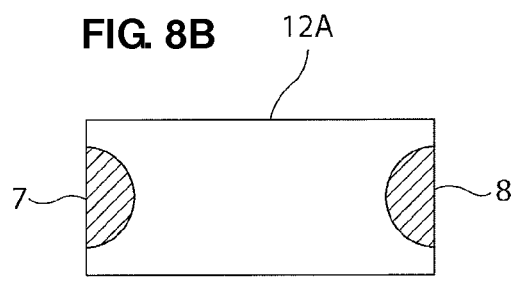
Figure 8C:
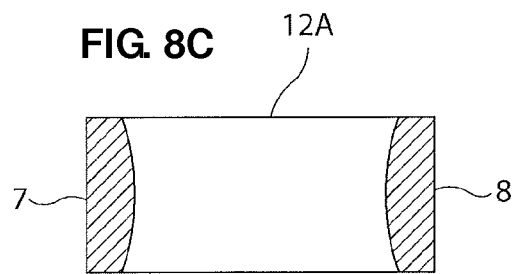

In addition, while the substantially rectangle first and second reinforcing electrodes 7 and 8 illustrated in FIG. 7 are preferably used in the present preferred embodiment, the first and second reinforcing electrodes 7 and 8 may also be arranged so as to substantially extend over the full width of the laminated body 12A as illustrated in FIG. 8A, namely, to substantially extend over the full width of the obtained ceramic sintered body 2. In addition, as illustrated in FIG. 8B, the substantially semicircular first and second reinforcing electrodes 7 and 8 may also be formed. Furthermore, as illustrated in FIG. 8C, the first and second reinforcing electrodes 7 and 8 may also substantially extend to the full width of the laminated body 12A and the valid region-side end edges thereof may also have the shapes of substantially convex curved lines in a central portion thereof.

In addition, it is preferable that the thickness of the ceramic green sheet of the above-mentioned mother ranges from about 0.5 μm to about 3.0 μm, for example. Within this range, it is possible to easily round the corner portion by barrel polishing, and it is possible to more reliably expose the valid region-side end portion of the reinforcing electrode. It is preferable that the thickness of the ceramic green sheet of the mother ranges from about 0.5 μm to about 1 μm, for example. In addition, if the thickness of the ceramic green sheet of the mother is substantially less than about 0.5 μm, handling is difficult or it may be difficult to ensure insulating capacity between the internal electrodes. In addition, if the thickness of the ceramic green sheet of the mother is too thick, it is difficult to round the ridge line portion and the corner portion by polishing. Accordingly, it is difficult to expose the end portion of the reinforcing electrode.

Due to the above-mentioned barrel polishing, the first and second reinforcing electrodes 7 and 8 are deflected and deformed in the thickness directions thereof. Therefore, the first and second reinforcing electrodes 7 and 8 are exposed in the forms of substantially curved lines on the top surface 2a or the bottom surface 2b of the finally obtained ceramic sintered body 2, as described above.

In addition, in the present preferred embodiment, as illustrated in FIG. 2, the reinforcing electrodes 7 and 8 are also preferably provided on the outer surface of the outermost layer sheet. However, the reinforcing electrode may not be provided on the outermost layer sheet. In addition, when the reinforcing electrodes 7 and 8 are formed on the outermost layer sheet as in the present preferred embodiment, the reinforcing electrode of the outermost layer sheet may also be removed by barrel polishing. Even in such a case, a plurality of reinforcing electrodes located on a center portion in relation to the reinforcing electrode of the outermost layer remain. Therefore, it is possible for a plurality of reinforcing electrodes whose turnback portion-side end portions are exposed on the top surface or the bottom surface of the ceramic sintered body to remain.

Next, the laminated body 12A obtained as described above is subjected to firing. By firing, the above-mentioned ceramic sintered body 2 is obtained.

Figure 10:
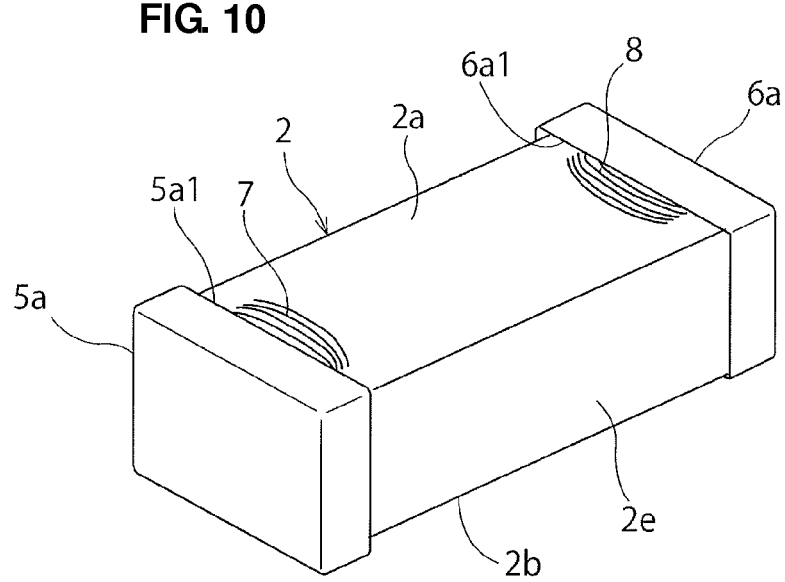
FIG. 10 is a perspective view illustrating a structure in which a thick-film electrode layer is provided in the ceramic sintered body in the first preferred embodiment of the present invention.

Next, the first side surface and the second side surface of the obtained ceramic sintered body 2 are provided with conductive paste. By burning the conductive paste, the thick-film electrode layers 5a and 6a illustrated in FIG. 10 are formed. In this case, with respect to the application portion of the conductive paste, the conductive paste is applied so that the above-mentioned end portion 5a1 remains within the first extraction region Y1 or the second extraction region Y2.

As illustrated in FIG. 10, in the ceramic sintered body 2, the thick-film electrode layers 5a and 6a are preferably formed so as to cover the first and second side surfaces. Here, the thick-film electrode layers 5a and 6a not only cover the first and second side surfaces but also are formed to include the turnback portion extending to the top surface 2a, the bottom surface 2b, the third side surface 2e, and the fourth side surface, which is on the side opposite to the third side surface 2e. However, the thick-film electrode layers 5a and 6a may also be formed so that the turnback portion is only provided on the top surface and the bottom surface.

At the appropriate time, the plated layers 5b and 6b are formed by non-electrolytic plating or electrolytic plating, for example. In this case, since the valid region-side end portions of the first and second reinforcing electrodes 7 and 8 are exposed, the plated film is formed so as to extend to the exposed end portions. Accordingly, as in the above-mentioned preferred embodiment, it is possible to form the plated layer 5b including the valid region-side end portion 5b1 displaced from the end portion 5a1 by the distance of L1.

Preferably, the end portions of the first and second reinforcing electrodes 7 and 8, which are on the sides opposite to the valid region-side end portions thereof, are covered by the thick-film electrode layers 5a and 6a as illustrated in FIG. 1A. Consequently, when electrolytic plating is performed, it is possible to reliably carry currents to the first and second reinforcing electrodes 7 and 8. Accordingly, it is possible to reliably attach the plated layer to the reinforcing electrode portion exposed in the valid region-side end portion.

As described above, it is possible to obtain the laminated ceramic capacitor 1 according to a preferred embodiment of the present invention.

Figure 11A:
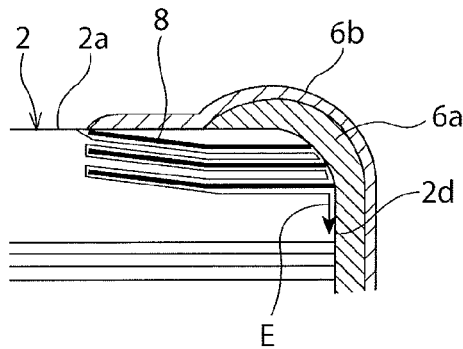
FIG. 11A is a partially cutaway elevation cross-sectional view for explaining an effect of the first preferred embodiment of the present invention.

In addition, in the present preferred embodiment, after the ceramic sintered body 2 is obtained, the conductive paste is preferably applied. On the other hand, the conductive paste may be applied after the laminated body 12A is obtained, and the laminated body 12A and the conductive paste may be co-fired at the appropriate time. That is, the ceramic sintered body and the thick-film electrode layers 5a and 6a may preferably be formed by co-firing. The thick-film electrode layers 5a and 6a are integrated with the reinforcing electrodes 7 and 8 by sintering. Therefore, it is possible to prevent water from infiltrating from the internal electrode turnback portion. This will be described with reference to FIG. 11A. In FIG. 11A, a portion is magnified and illustrated in which the second reinforcing electrode 8 is formed. In this structure, the end portions of the plurality of second reinforcing electrodes 8, which are on the side opposite to the valid region-side end portions thereof, are integrated with the thick-film electrode layer 6a by sintering. Therefore, even if water infiltrates from the internal electrode turnback portion as illustrated by an arrow E, the infiltration route of water is long. Since water does not infiltrate beyond the sintered portion of the second reinforcing electrode 8 and the thick-film electrode layer 6a and move downward through the second side surface 2d, the infiltration route of water is long.

Figure 11B:
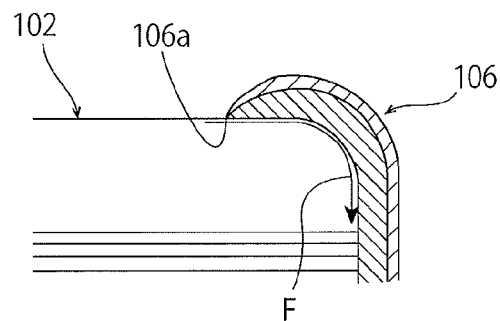
FIG. 11B is a schematic partially cutaway elevation cross-sectional view illustrating the proximity of an end portion of an external electrode turnback portion in an electronic component of the related art.
Figure 12:
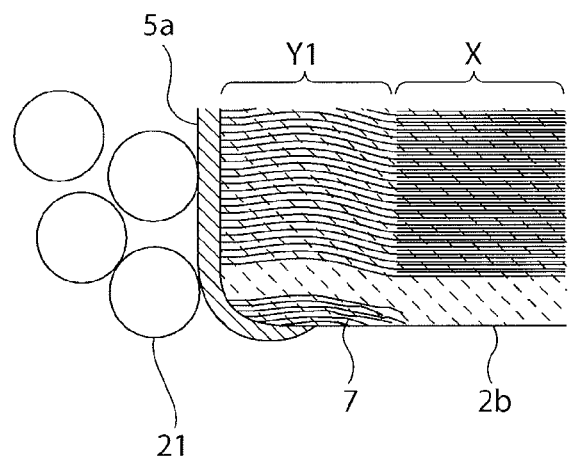
FIG. 12 is a partially cutaway elevation cross-sectional view for explaining a process in which a plated layer is formed at the time of the formation of an external electrode in the first preferred embodiment of the present invention.

On the other hand, as illustrated in FIG. 11B, in the laminated ceramic capacitor of the related art, water infiltrating from the end portion 106a of the external electrode 106 moves as illustrated by an arrow F. Namely, water moves downward through the outer surface of the ceramic sintered body 102. Therefore, the infiltration route of water is short, and moisture resistance is significantly reduced.

In addition, a problem that the shape of the external electrode turnback portion becomes substantially crescent shaped does not occurs which becomes a problem in a dipping method. When the external electrode turnback portion becomes substantially crescent shaped, inadequate mounting is likely to occur at the time of mounting electronic components.

In addition, in the manufacturing method of the above-mentioned preferred embodiment, a dimension in the length direction of the external electrode turnback portion is less susceptible to the application process of the conductive paste. In the application of the conductive paste, the conductive paste having a substantially constant thickness is formed substantially in layers on a plain plate, and the first side surface and second side surface of the ceramic sintered body 102 are dipped in the conductive paste, thereby applying the conductive paste. Accordingly, it is difficult to control a dimension with a high degree of accuracy within about ±30 μm, for example. On the other hand, in the present preferred embodiment, the entire length of the turnback portion is determined based on the plated layers 5b and 6b. Accordingly, since it is possible to control the exposed portion of the above-mentioned reinforcing electrode with a high degree of accuracy, constant length direction dimensions in the turnback portions of the plated layers 5b and 6b are easily maintained. Furthermore, it is also possible to control the area or the thickness of the turnback portion with a high degree of accuracy.

In addition, by selecting the length direction dimensions of the first and second reinforcing electrodes 7 and 8, it is also possible to easily adjust the distances L1 between the turnback portion-side end portions of the thick-film electrode layers 5a and 6a and the end portions of the plated layers 5b and 6b. It is preferable that, in order to distribute the concentration of stresses and in view of the accuracy of the conductive paste application by dipping, the above-mentioned distance L1 is greater than or equal to about 30 μm, for example.

Furthermore, when the plated layers 5b and 6b are formed by electrolytic plating, the end portion of the first reinforcing electrode 7, which is on the side opposite to the valid region-side end portion thereof, is coated by the thick-film electrode layer 5a. Accordingly, the medium ball 21 used at the time of non-electrolytic plating comes into secure contact with the thick-film electrode layer 5a. In addition, since the thick-film electrode layer 5a and the first reinforcing electrode 7 come into contact with each other, it is also possible to reliably form a plated film on the exposed end portion 5b1 side of the first reinforcing electrode 7.

The occurrence rate of a crack at the time of substrate mounting in the laminated ceramic capacitor of the present preferred embodiment, obtained as described above, was evaluated. As the laminated ceramic capacitor of the preferred embodiment, a laminated ceramic capacitor was prepared that was a ceramic sintered body about 1.6 mm long, about 0.8 mm wide, and about 0.8 mm thick and in which the numbers of lamination of the first and second reinforcing electrodes thereof were about 40 on the upper side and about 40 on the lower side, the above-mentioned distance L was about 50 μm, and the length direction dimension of the external electrode turnback portion was about 150 μm. A substrate that was about 1 mm in a thickness direction, about 40 mm in a width direction, and about 100 mm in a length direction was prepared, the laminated ceramic capacitor was mounted in the approximate center of the substrate with the length direction of the laminated ceramic capacitor being aligned with the length direction of the substrate, both end portions thereof located in the length direction of the substrate were held, deflection was caused to occur by pressing a jig whose curvature radius was about 230 mm into the back side of a surface on which the laminated ceramic capacitor was mounted, and the amount of pressing was defined as the amount of deflection. In addition, cracks extending to the valid layer were counted. A relationship between the amount of deflection and the occurrence rate of a crack in the ceramic sintered body is illustrated in FIG. 13.

For comparison, in the same manner, the laminated ceramic capacitor of the related art was also evaluated that is configured as described above, with the exception of including no first and second reinforcing electrodes. The result is illustrated in FIG. 13.

Figure 13:
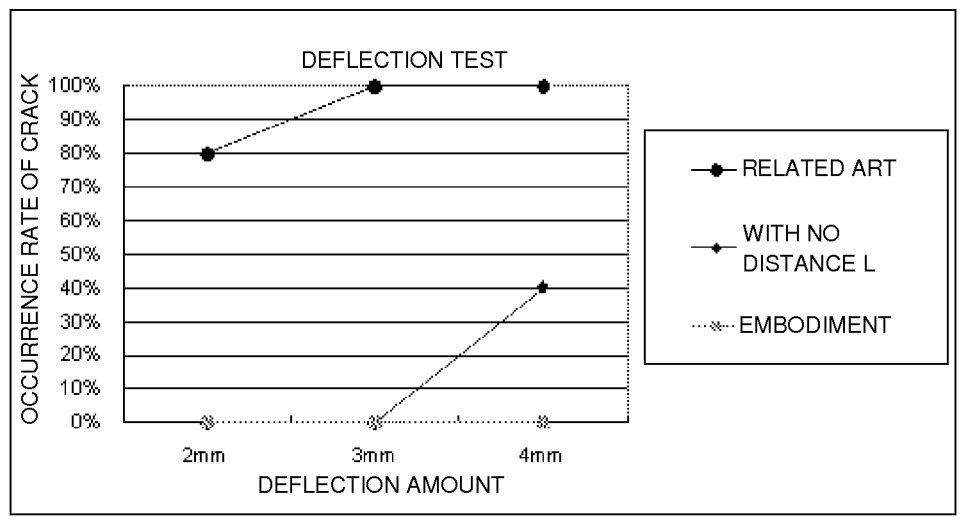
FIG. 13 is a diagram illustrating relationships between amounts of substrate deflection after mounting and occurrence rates of cracks of an electronic component of a preferred embodiment relating to the first preferred embodiment of the present invention and an electronic component of the related art prepared for comparison.

As shown in FIG. 13, according to the present preferred embodiment, even if the amount of deflection of the substrate increases, the occurrence rate of cracks is prevented from increasing, and the occurrence of cracks is minimized.

Figure 14:
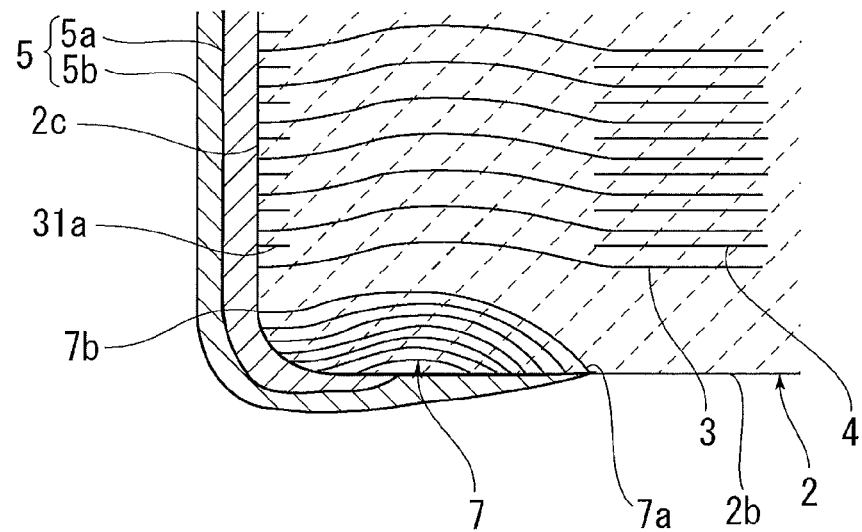
FIG. 14 is a schematic cross-sectional view enlarging and illustrating a portion of a ceramic electronic component according to a second preferred embodiment of the present invention.

FIG. 14 is a partially cutaway enlarged cross-sectional view illustrating the main portion of the laminated ceramic capacitor according to a second preferred embodiment of the present invention. In the second preferred embodiment, as illustrated in FIG. 14, a first extraction auxiliary electrode 31a is preferably provided. The first extraction auxiliary electrode 31a and the first internal electrode 3 overlap each other on the first side surface 2c side of the ceramic sintered body 2. The first extraction auxiliary electrode 31a is extracted to the first side surface 2c. In addition, the first extraction auxiliary electrode 31a is preferably arranged at about the same or substantially the same height position as that of the second internal electrode 4.

While not being illustrated in FIG. 14, on the opposite side surface, the second extraction auxiliary electrode is preferably arranged so as to overlap with the second internal electrode 4 through the ceramic layer.

Figure 15:
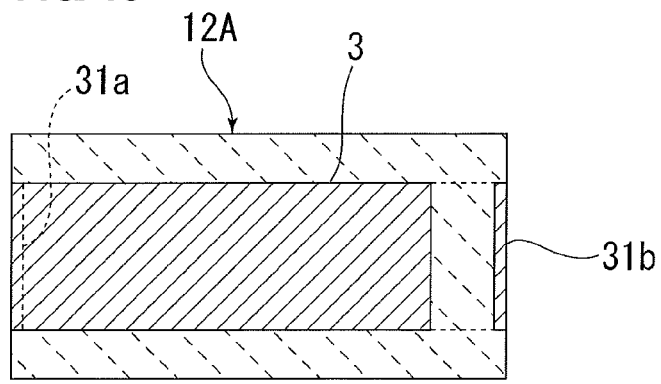
FIG. 15 is a partially enlarged elevation cross-sectional view of the ceramic electronic component of the second preferred embodiment of the present invention.

FIG. 15 is the plan cross-sectional view of the laminated body 12A according to the second preferred embodiment. Within the laminated body 12A, a second extraction auxiliary electrode 31b is preferably provided at about the same height position as that of the first internal electrode 3. In addition, the first extraction auxiliary electrode 31a indicated by a dashed line is arranged so as to overlap with the first internal electrode 3 through the ceramic layer.

The laminated ceramic capacitor of the second preferred embodiment is substantially the same as the laminated ceramic capacitor in the first preferred embodiment, with the exception that the first and second extraction auxiliary electrodes 31a and 31b are provided.

Figure 16A:
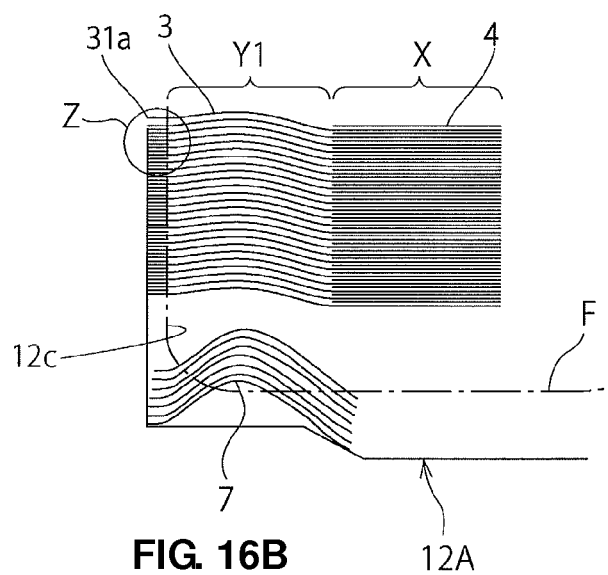
FIG. 16A is a partially cutaway elevation cross-sectional view illustrating a main portion of a laminated body before barrel polishing in the second preferred embodiment of the present invention.
Figure 16B:
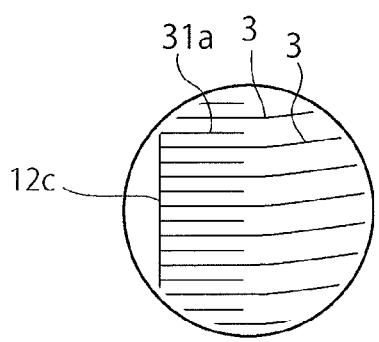
FIG. 16B is an enlarged view of a portion surrounded by a circle in FIG. 16A.

FIG. 16A is an elevation cross-sectional view of a portion to be subjected to barrel polishing after the laminated body 12A is obtained in substantially the same manner as in the first preferred embodiment, and FIG. 16B is the enlarged view of a portion surrounded by a circle Z in FIG. 16A. In the present preferred embodiment, the plurality of first extraction auxiliary electrodes 31a are laminated on the first side surface to which the plurality of first internal electrodes 3 extend. In FIGS. 16A and 16B, a state before barrel polishing is illustrated. Due to the barrel polishing, the ceramic laminated body 12A is polished up to a portion indicated by a dashed-dotted line F in FIG. 16B. The first extraction auxiliary electrode 31a is laminated between the plurality of first internal electrodes 3, and is exposed on the first side surface 12c as a result of the barrel polishing.

The extraction auxiliary electrode 31a extends to a length direction outer side portion in relation to a portion polished by the barrel polishing. Therefore, the plurality of first reinforcing electrodes 7 are deflected as illustrated in FIG. 16A. Namely, in a portion in which the extraction auxiliary electrode 31a is disposed, the plurality of first reinforcing electrodes 7 are preferably deflected so as to be located on a thickness direction outer side portion. Even in such a structure, when the ceramic laminated body 12A is polished up to the portion indicated by the dashed-dotted line F, the turnback portion-side end portion of the first reinforcing electrode 7 is preferably exposed on the ceramic laminated body surface, and the other-side end portion thereof is exposed on the corner portion or the end surface of the ridge line. A preferred embodiment of the present invention is also applied to a structure in which such an extraction auxiliary electrode 31a is provided.

In addition, on the second side surface side or on the upper outer layer portion side of the ceramic laminated body, the first and second reinforcing electrodes 7 and 8 are also preferably arranged in the same manner.

When the above-mentioned extraction auxiliary electrodes 31a and 31b are provided, the first reinforcing electrode 7 is preferably deflected as described above. In this case, preferably, a distance between the first reinforcing electrodes 7 exposed on the laminated body surface decreases with an increase in distance from the corner portion increases, and increases with a decrease in distance from the corner portion. Accordingly, in the corner portion, a distance between the exposed portions of the first reinforcing electrodes 7 increases, and a fully wide reinforcing electrode exposed portion is formed. Accordingly, in the corner portion, it is easy to increase the thickness of the internal electrode.

It is preferable that the thicknesses of the extraction auxiliary electrodes 31a and 31b range from about 0.3 μm to about 2.0 μm, for example. If the thickness of the extraction auxiliary electrode is too thin, it is difficult to deflect the first reinforcing electrode 7 as illustrated in FIG. 16A. In addition, if the thickness of the extraction auxiliary electrode is too thick, the first internal electrode 3 is shifted too much upward or downward in the thickness direction, in the extraction portion, and reliability is reduced. In addition, individual dimensions are obtained by polishing the cross-section of the laminated ceramic capacitor and measuring the cross-section with an optical microscope.

Figure 17:
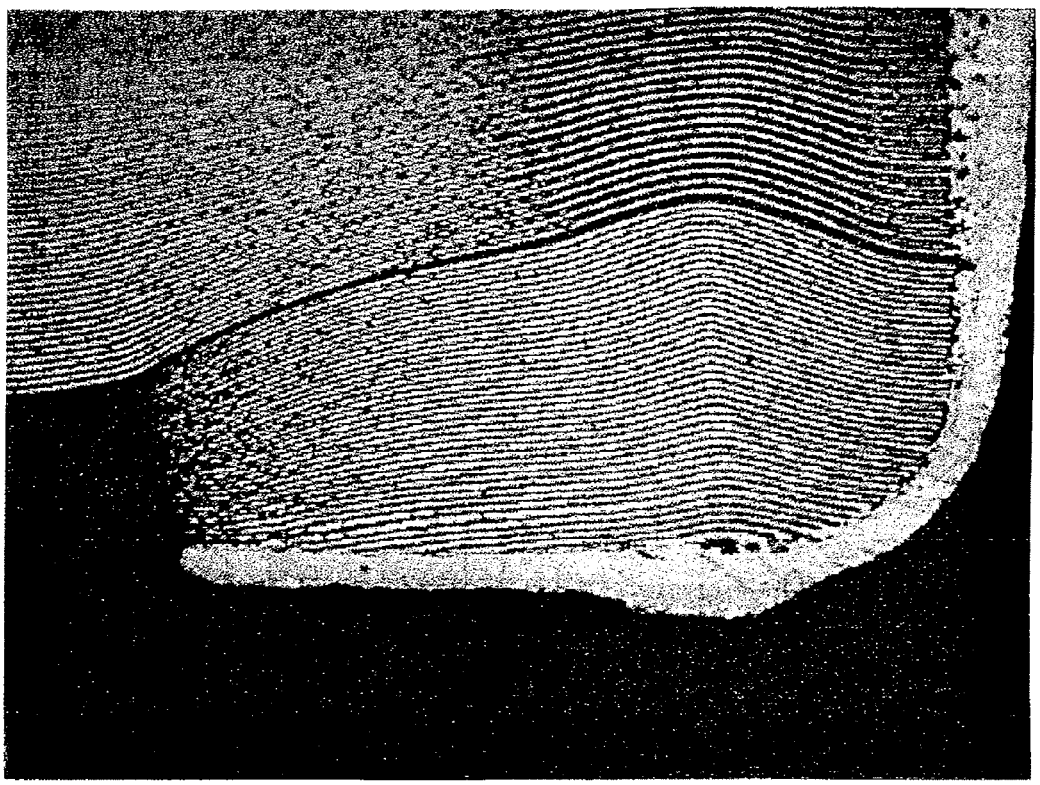
FIG. 17 is an electron microscope photograph illustrating a portion of the ceramic electronic component according to the second preferred embodiment of the present invention.

FIG. 17 is an electron microscope photograph illustrating the deflection state of the reinforcing electrode of the ceramic sintered body obtained in the second preferred embodiment. As shown in FIG. 17, in the second preferred embodiment, the plurality of reinforcing electrodes are deflected and at least a portion of an end portion on the valid region side is preferably exposed on the bottom surface of the ceramic sintered body.

Figure 18:
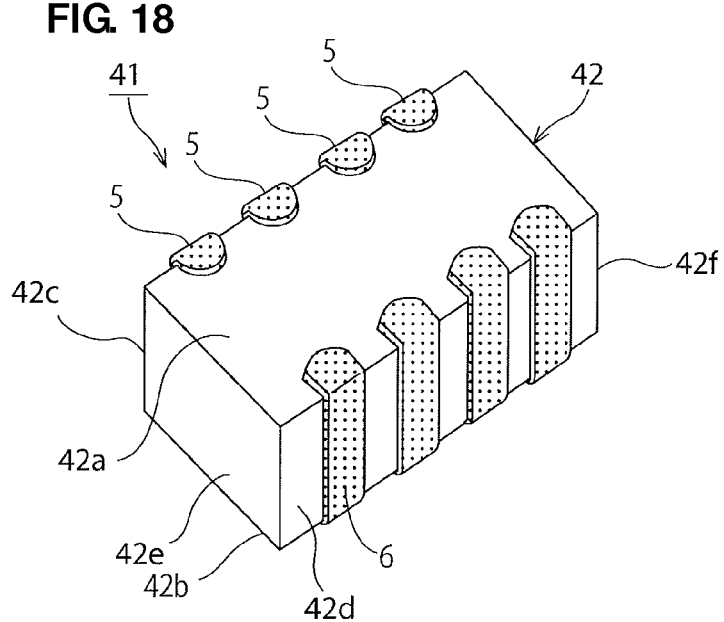
FIG. 18 is a perspective view illustrating an electronic component according to a third preferred embodiment of the present invention.

FIG. 18 is a perspective view illustrating a laminated ceramic capacitor 41 according to a third preferred embodiment of the present invention.

The laminated ceramic capacitor 41 preferably includes a ceramic sintered body 42 having a substantially rectangular parallelepiped shape. The ceramic sintered body 42 includes a top surface 42a, a bottom surface 42b, and first to fourth side surfaces 42c to 42f connecting the top surface 42a and the bottom surface 42b to each other.

In the third preferred embodiment, the plurality of first external electrodes 5 are provided on the first side surface 42c side. Particularly, the first external electrode 5 extends along the first side surface 42c and preferably includes a turnback portion extending to the top surface 42a and the bottom surface 42b. In the same manner, the plurality of second external electrodes 6 are also provided on the second side surface 42d. The external electrodes 5 and 6 of the present preferred embodiment are configured in substantially the same manner as the first external electrodes 5 and 6 of the first preferred embodiment.

Figure 19A:
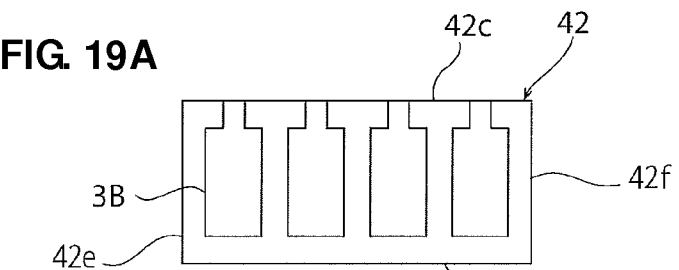
FIGS. 19A to 19C are individual schematic plan views to explain first and second internal electrodes and a terminal electrode, formed in the third preferred embodiment of the present invention.
Figure 19B:
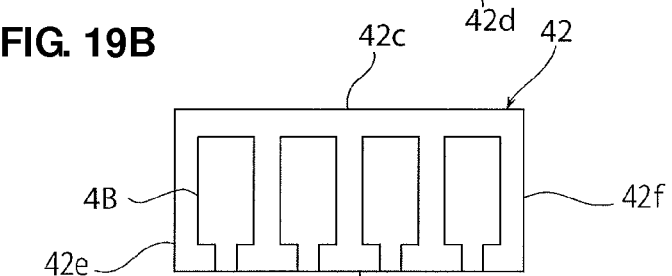

Within the ceramic sintered body 42, a first internal electrode 3B illustrated in FIG. 19A and a second internal electrode 4B illustrated in FIG. 19B overlap each other through the ceramic layer. Particularly, the plurality of first internal electrodes 3B extend to the first side surface 42c. The plurality of first internal electrodes 3B are preferably individually electrically connected to the plurality of first external electrodes 5. In substantially the same manner, the plurality of second internal electrodes 4B are preferably individually electrically connected to the plurality second external electrodes 6.

Accordingly, in the present preferred embodiment, a plurality of capacitor units, each of which includes the first and second internal electrodes 3 and 4 and the first and second external electrodes 5 and 6, are preferably provided in parallel in a direction in which the third side surface 42e and the fourth side surface 42f are connected to each other within the ceramic sintered body 42. In other words, the ceramic sintered body 42 preferably includes a plurality of laminated ceramic capacitors 1 of the first preferred embodiment that are integrated. In the present preferred embodiment, in substantially the same manner as in the first preferred embodiment, each of the first and second external electrodes 5 and 6 preferably includes a thick-film electrode layer and a plated layer that are laminated. In addition, the first and second reinforcing electrodes are preferably provided in the first and second outer layer portions.

Figure 19C:
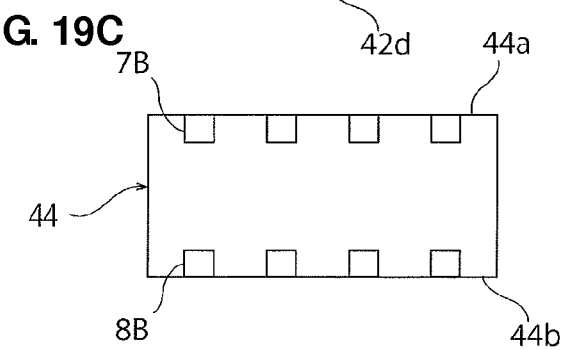

FIG. 19C is a schematic plan view of a reinforcing electrode pattern provided on a ceramic green sheet when the above-mentioned ceramic sintered body 42 is obtained. Here, in a substantially rectangular ceramic green sheet 44 before firing, an electrode pattern 7B used to form the first reinforcing electrode is arranged so as to be arranged along one end edge 44a. In substantially the same manner, an electrode pattern 8B used to form the second reinforcing electrode is provided on a second end edge 44b side. The end edges 44a and 44b are preferably located at positions corresponding to the first side surface 42c and the second side surface 42d in the ceramic sintered body 42 after firing.

By laminating the plurality of ceramic green sheets 44 on which the electrode patterns 7B and 8B used to form the above-mentioned reinforcing electrodes are printed, the first and second reinforcing electrode formation portions are configured.

In the electronic component according to another preferred embodiment of the present invention, a plurality of electronic component units, each of which includes the first and second reinforcing electrodes, may preferably be provided in one ceramic sintered body 42.

Figure 20A:
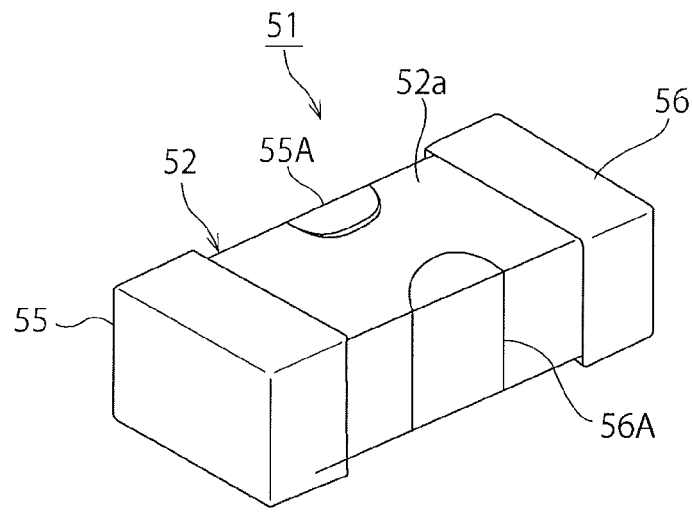
FIG. 20A is a perspective view of an electronic component according to a fourth preferred embodiment of the present invention.

FIG. 20A is a perspective view illustrating a laminated ceramic capacitor as an electronic component according to a fourth preferred embodiment of the present invention. A laminated ceramic capacitor 51 preferably includes a ceramic sintered body 52. The ceramic sintered body 52 preferably has a substantially rectangular parallelepiped shape.

Figure 20B:
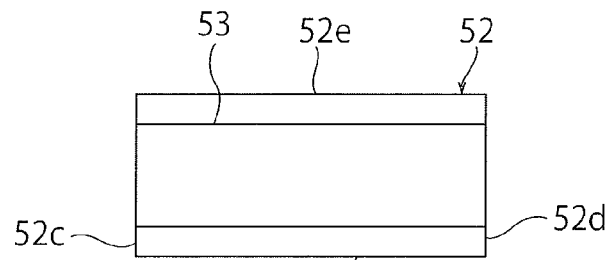
FIGS. 20B to 20D are individual schematic plan views to explain electrode patterns formed within a ceramic sintered body in the fourth preferred embodiment of the present invention.

FIG. 20B is a plan cross-sectional view of a first internal electrode 53 disposed within the ceramic sintered body 52. Within the ceramic sintered body 52, a first internal electrode 53 is preferably arranged so as to extend to a first side surface 52c and a second side surface 52d facing the first side surface 52c.

Figure 20C:
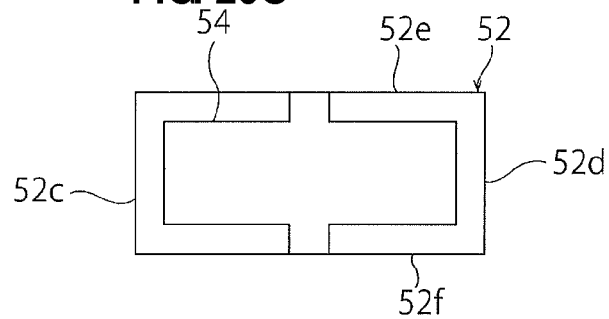

A second internal electrode 54 illustrated in FIG. 20C is preferably arranged so as to overlap the first internal electrode 53 through the ceramic layer. The second internal electrode 54 preferably extends to central portions of third and fourth side surfaces 52e and 52f of the ceramic sintered body 52, which face each other.

As described above, the first internal electrode 53 is preferably defined by a through-hole electrode. It is preferable that the second internal electrode 54 is used as an internal electrode connected to a ground potential.

It is assumed that a direction in which the first side surface 52c and the second side surface 52d are connected to each other is a length direction. Since the first and second internal electrodes 53 and 54 are arranged as described above, first external electrodes 55 and 56 are provided at both length direction end portions of the ceramic sintered body 52 as illustrated in FIG. 20A. The first external electrodes 55 and 56 are electrically connected to the first internal electrode 53. On the other hand, second external electrodes 55A and 56A are arranged so as to cover the third and fourth side surfaces 52e and 52f of the ceramic sintered body 52. The second external electrodes 55A and 56A are electrically connected to the second internal electrode 54.

The above-mentioned first internal electrodes 53 and second internal electrodes 54 are alternately laminated in a plurality of layers in the thickness direction of the ceramic sintered body 52.

Also in the present preferred embodiment, outer layer portions are preferably arranged above and below a portion in which the above-mentioned first and second internal electrodes 53 and 54 are laminated. In addition, in substantially the same manner as in the first preferred embodiment, the plurality of first and second reinforcing electrodes are preferably provided in the outer layer portion.

Figure 20D:
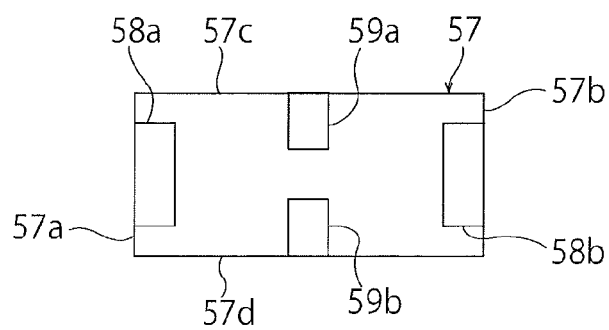

FIG. 20D is a schematic plan view illustrating the ceramic green sheet 57 on which an electrode pattern used to form the reinforcing electrode is provided. End edges 57a and 57b, which are located at both length direction end portions of the ceramic green sheet 57 and which extend in the width direction thereof, preferably correspond to portions in which the first and second side surfaces 52c and 52d are located. Electrode patterns 58a and 58b used to form the first reinforcing electrode layer are preferably arranged inward from the end edges 57a and 57b.

In substantially the same manner, in the central portions of the end edges 57c and 57d extending in the length direction, electrode patterns 59a and 59b used to form the second reinforcing electrode are preferably arranged so as to extend inward. By laminating the plurality of ceramic green sheets 57 on which such electrode patterns 58a, 58b, 59a, and 59b are printed, it is possible to configure the outer layer portion. In addition, as described above, by performing barrel polishing and firing after the ceramic laminated body is obtained, it is possible to form the first and second reinforcing electrodes in substantially the same manner as in the first preferred embodiment. Particularly, at a stage in which the ceramic sintered body 52 is obtained, it is possible to expose, to the top surface 52a and the bottom surface 52b of the ceramic sintered body 52, at least a portion of the valid region-side end portions of the plurality of first and second reinforcing electrodes. Accordingly, in substantially the same manner as in the first preferred embodiment, by forming the thick-film electrode layer and the plated layer, it is possible to displace the valid region-side end portions of the external electrodes 55 and 56 from the valid region-side end portions of the thick-film electrode layers.

Also in the present preferred embodiment, in substantially the same way as in the first preferred embodiment, it is possible to obtain the laminated ceramic capacitor 51 in which cracks caused to the concentration of stresses do not occur.

In addition, in the present preferred embodiment, the valid region is a region in which the first internal electrode 53 and the second internal electrode 54 overlap each other through the ceramic layer. In addition, in the present preferred embodiment, in the ceramic sintered body 52, the first extraction regions are preferably provided on both sides of the valid region in the length direction thereof, and the second extraction regions are preferably provided on both sides of the ceramic sintered body 52 in the width direction thereof in the valid region.

As described above, it is preferable that the second internal electrode 54 is used as an internal electrode connected to the ground potential. In addition, in this case, the second external electrodes 55A and 56A are external electrodes on a side to be connected to the ground potential. Accordingly, extremely high reliability is not necessary. Accordingly, the second external electrodes 55A and 56A may include no thick-film electrode layer and be formed only using a plated layer.

It is clear from the second to fourth preferred embodiments of the present invention that the lamination form and the extraction position of an internal electrode in an electronic component to which the present invention is applied are not particularly limited.

In the first preferred embodiment, in the plurality of first reinforcing electrodes, the planar shapes of the reinforcing electrodes in a laminated body stage before firing are the same or substantially the same. However, the planar shapes of the plurality of first reinforcing electrodes before firing may be different.

Figure 21A:
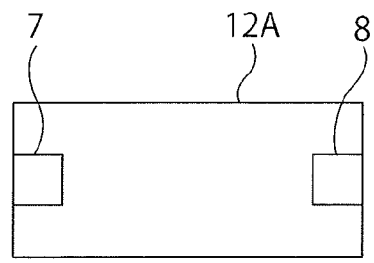
FIGS. 21A to 21C are individual schematic plan views illustrating examples of modifications in which the shapes of a plurality of first and second reinforcing electrodes are different.
Figure 21B:
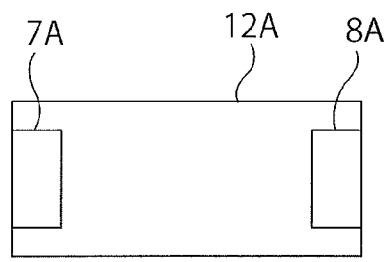
Figure 21C:
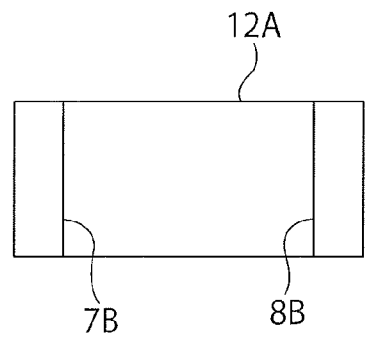

For example, FIGS. 21A to 21C schematically illustrate the planar shapes of the plurality of first and second reinforcing electrodes 7, 7A, 7B, 8, 8A, and 8B within the laminated body 12A before firing, the laminated body 12A being used to obtain the laminated ceramic capacitor 1 of the first preferred embodiment. Here, from the first and second reinforcing electrodes 7 and 8 to the first and second reinforcing electrodes 7B and 8B illustrated in FIG. 21C, the width direction dimensions thereof increase in order. In this case, while any side may be located on the outer surface side of the laminated body, it is possible to easily adjust the degree of exposure of portions in which the first and second reinforcing electrodes are exposed on the top surface or the bottom surface of the ceramic sintered body after barrel polishing and firing.

Figure 22A:
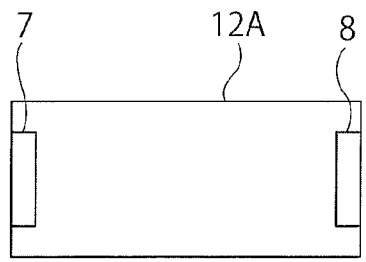
FIGS. 22A to 22C are individual schematic plan views illustrating other examples of modifications in which the shapes of the plural first and second reinforcing electrodes are different.
Figure 22B:
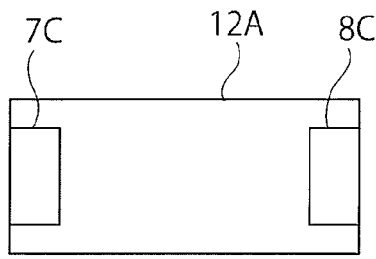
Figure 22C:
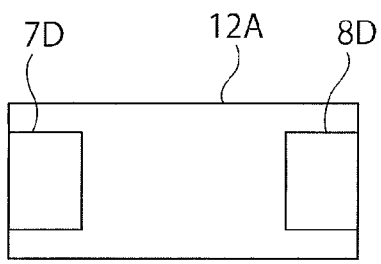
Figure 23A:
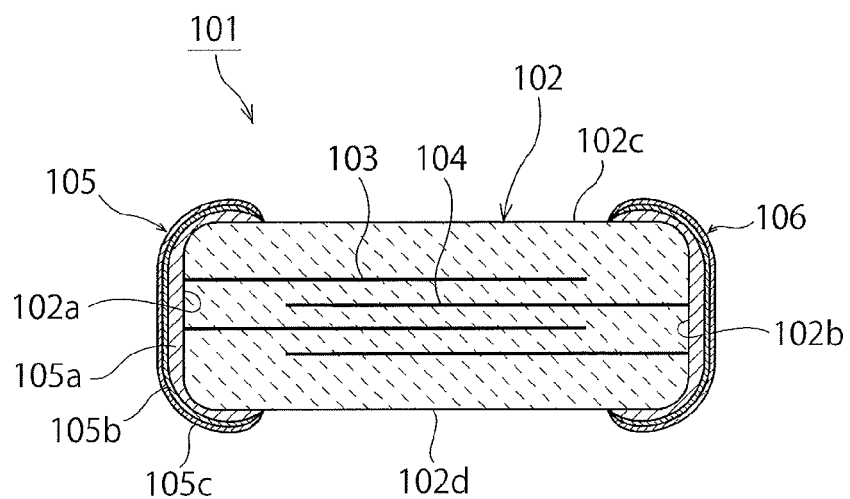
FIGS. 23A and 23B are an elevation cross-sectional view of a laminated ceramic capacitor of the related art and a partially cutaway elevation cross-sectional view enlarging and illustrating a main portion thereof.
Figure 23B:
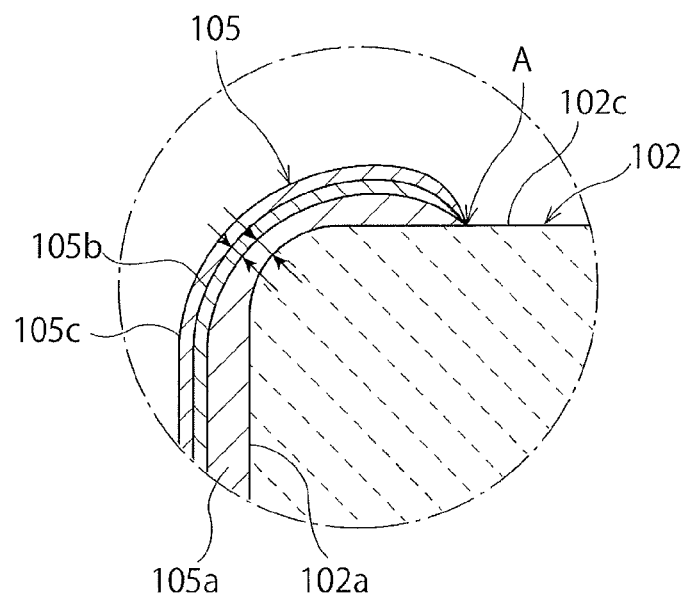

In substantially the same manner, as illustrated in FIGS. 22A to 22C, the above-mentioned length direction dimensions of the first reinforcing electrodes 7, 7C, and 7D and the second reinforcing electrodes 8, 8C, and 8D, that is, the positions of the valid region-side end portions, may also be different. In this case, it is also possible to easily adjust the degree of exposure of the first and second reinforcing electrodes after the laminated body 12A is subjected to barrel polishing and firing.

While, in the above-mentioned preferred embodiments of the present invention, an electronic component which functions as a ceramic capacitor has been described, preferred embodiments of the present invention are not limited to the ceramic capacitor. The electronic component according to preferred embodiments of the present invention may be a ceramic piezoelectric element, a thermistor element utilizing semiconductive ceramic, a ceramic inductor element, or a ceramic resistive element, for example. Accordingly, a thermistor body may be arbitrarily formed using piezoelectric ceramics, semiconductive ceramics, magnetic ceramics, or resistor ceramics, for example.

In addition, while, in each of the above-mentioned preferred embodiments and modifications, the plurality of internal electrodes are preferably provided within the ceramic body, preferred embodiments of the present invention may also be applied to an electronic component in which an internal electrode other than the above-mentioned reinforcing electrode is not included in the ceramic body. For example, preferred embodiments of the present invention may also be applied to an electronic component in which the first and second external electrodes are provided on both end surfaces of a ceramic body including resistive ceramics. Even in such a case, a plurality of reinforcing electrodes are preferably provided within a ceramic body in accordance with a preferred embodiment of the present invention, and thus, it is possible to provide an external electrode whose end edge is located on a center portion in relation to the end edge of a thick-film electrode layer. Accordingly, it is possible to improve the intensity of the adhesiveness of a plated layer to the ceramic body, and it is possible to improve reliability. In addition, it is possible to effectively prevent cracks in the ceramic body due to an external stress.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a substantially rectangular parallelepiped-shaped ceramic body including a top surface, a bottom surface, and first to fourth side surfaces connecting the top surface and the bottom surface to each other;
    a first external electrode provided on one side surface of the first to fourth side surfaces; and
    a second external electrode provided on another side surface of the first to fourth side surfaces; wherein
    each of the first and second external electrodes includes a thick-film electrode layer including sintered metal and a plated layer arranged so as to cover the thick-film electrode layer;
    each of the first and second external electrodes includes an external electrode main body portion covering the side surface on which the one of the first and second external electrodes is provided and turnback portions that extend to the top surface and the bottom surface of the ceramic body;
    the electronic component further includes a plurality of reinforcing electrodes provided within the ceramic body, wherein an end portion of at least one reinforcing electrode of the plurality of reinforcing electrodes is exposed on the top surface or the bottom surface of the ceramic body closer to a center of the top surface or the bottom surface of the ceramic body at which the end portion of the at least one reinforcing electrode is exposed than the thick-film electrode layer in the turnback portion, the plated layer is arranged so as to cover the thick-film electrode layer and the exposed end portion of the at least one reinforcing electrode, and an end edge of the plated layer is located closer to the center of top surface or the bottom surface of the ceramic body than an end edge of the thick-film electrode layer in the turnback portion; and the exposed end portion of the at least one reinforcing electrode is spaced away from the end edge of the thick-film electrode layer in the turnback portion towards the center of the top surface or the bottom surface of the ceramic body at which the end portion of the at least one reinforcing electrode is exposed such that the thick-film electrode layer does not cover the exposed end portion of the at least one reinforcing electrode and the plated layer directly covers the exposed end portion of the at least one reinforcing electrode without the thick-film electrode being disposed therebetween.

2. The electronic component according to claim 1, wherein the ceramic body includes a ceramic sintered body and a plurality of internal electrodes disposed within the ceramic sintered body so as to overlap one another through a ceramic layer;

the plurality of internal electrodes include a first internal electrode extending to at least one side surface of the first to fourth side surfaces of the ceramic body and a second internal electrode extending to at least another side surface of the first to fourth side surfaces of the ceramic body; and the first and second external electrodes are provided on the side surfaces to which the first and second internal electrodes extend, respectively.

3. The electronic component according to claim 2, wherein when a region in which the first and second internal electrodes are connected to different potentials overlap one another through the ceramic layer is a valid region, and regions, located on an outer side of the valid region and located between the valid region and the side surfaces to which the first and second internal electrodes extend, are first and second extraction regions, respectively, the plurality of reinforcing electrodes include a plurality of first reinforcing electrodes arranged so as to extend onto the first extraction region and the valid region and a plurality of second reinforcing electrodes arranged so as to extend onto the second extraction region and the valid region.

4. The electronic component according to claim 3, wherein the plurality of first and second reinforcing electrodes are disposed in at least one of outer layer portions located above and below a portion in which the plurality of internal electrodes are disposed.

5. The electronic component according to claim 4, wherein the first and second reinforcing electrodes are provided in both of the outer layer portions located above and below a portion in which the plurality of internal electrodes overlap one another.

6. The electronic component according to claim 4, wherein areas of the plurality of first and second reinforcing electrodes decrease as a distance from a closer one of the top surface and the bottom surface of the ceramic body decreases.

7. The electronic component according to claim 4, wherein when dimensions in which the valid region-side end portions of the first and second reinforcing electrodes are connected to opposite-side end portions thereof are lengths of the first and second reinforcing electrodes, the lengths of the first and second reinforcing electrodes decrease as a distance from a closer one of the top surface and the bottom surface of the ceramic sintered body decreases.

8. The electronic component according to claim 4, wherein in the first and second extraction regions, first and second extraction auxiliary electrodes extend to the side surfaces, respectively, to which the first and second internal electrodes of the ceramic sintered body extend and do not extend to the valid region and are arranged so as to overlap the first and second internal electrodes through the ceramic layer.

9. The electronic component according to claim 4, wherein among the first to fourth side surfaces, the first and second internal electrodes extend to the first and second side surfaces facing each other, respectively.

10. The electronic component according to claim 4, wherein
among the first to fourth side surfaces, the first internal electrode extends to the first and second side surfaces facing each other, and the second internal electrode is extracted to the third and fourth side surfaces facing each other.

11. The electronic component according to claim 2, wherein
a plurality of units are provided and each of the plurality of units includes the first and second internal electrodes and the first and second external electrodes.

12. The electronic component according to claim 1, wherein
the electronic component is a laminated ceramic capacitor.

* * * * *